June 5, 1945.  G. F. DALY  2,377,762
ACCOUNTING MACHINE
Filed July 8, 1941  14 Sheets-Sheet 1

INVENTOR
George F. Daly
BY
W. M. Wilson
ATTORNEY

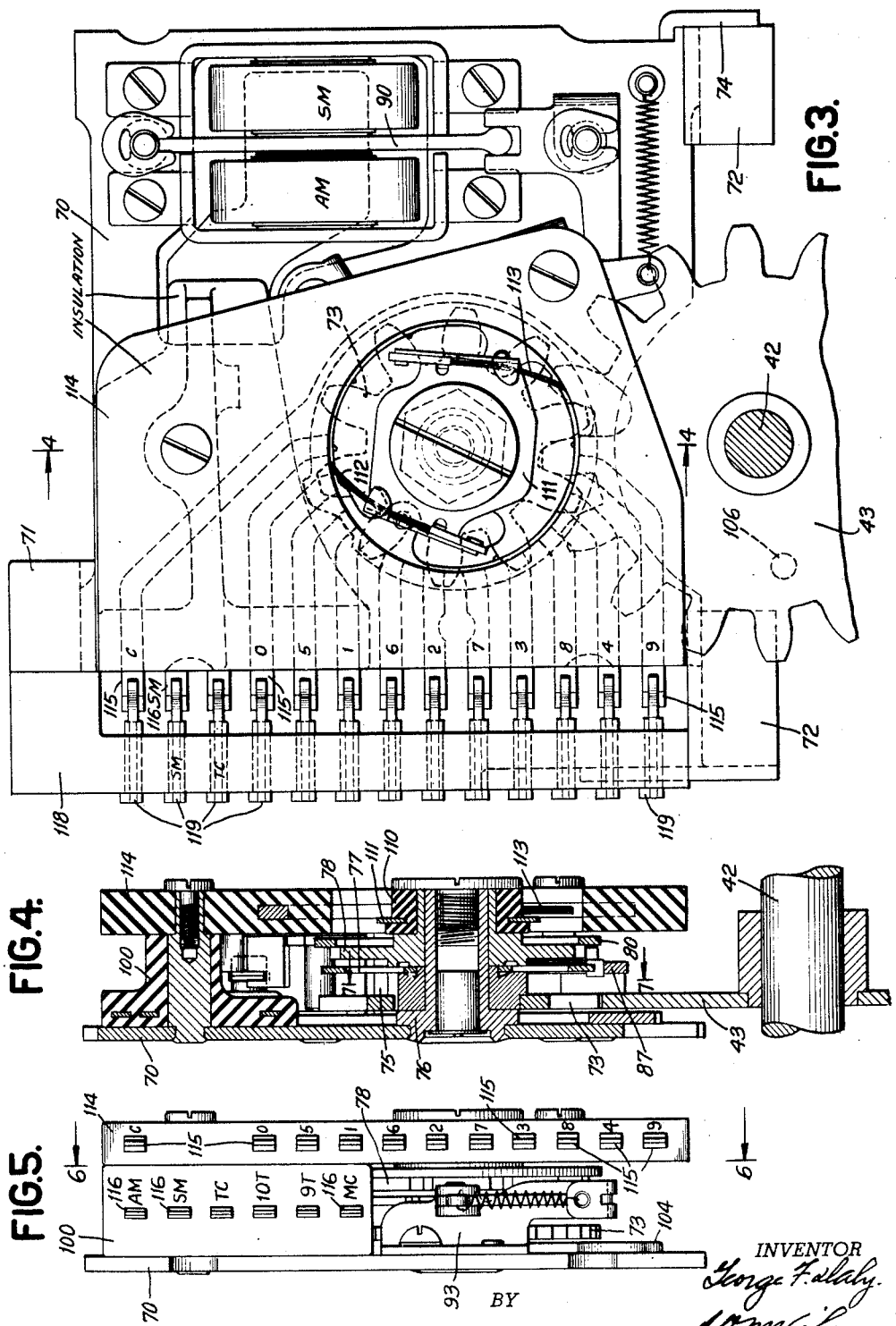

June 5, 1945.　　　　G. F. DALY　　　　2,377,762
ACCOUNTING MACHINE
Filed July 8, 1941　　　14 Sheets-Sheet 4

INVENTOR
George F. Daly
BY
W. M. Wilson
ATTORNEY

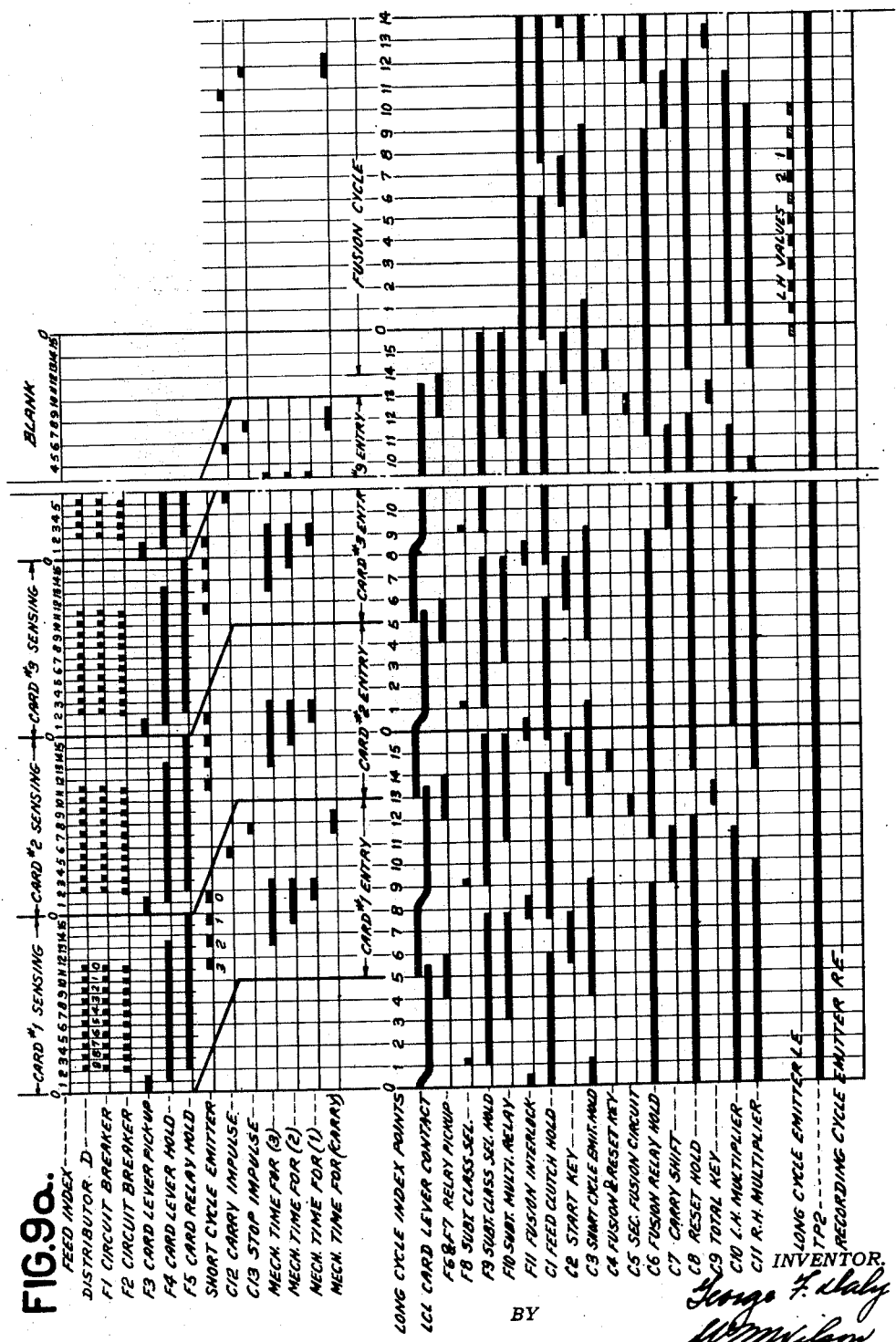

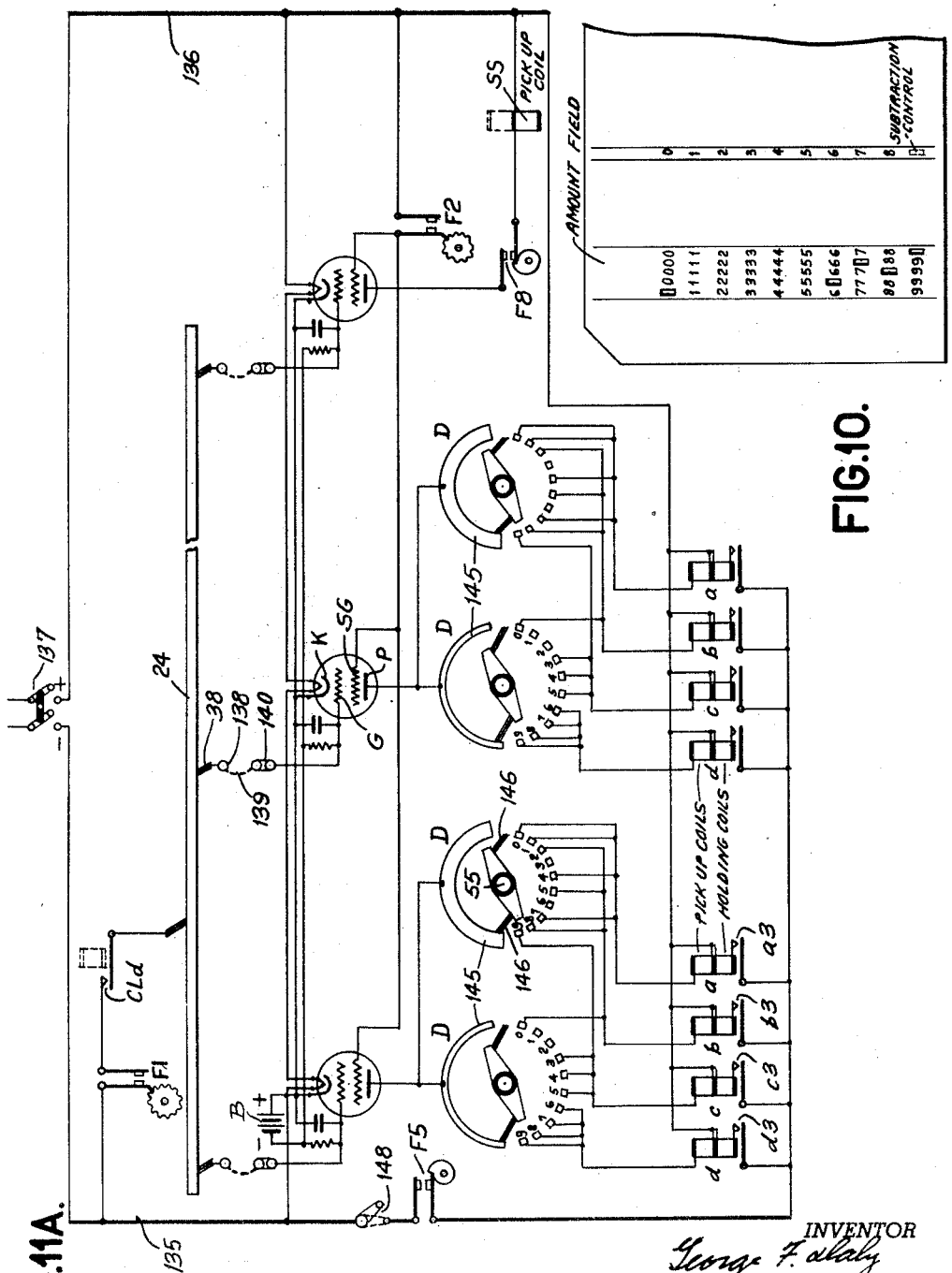

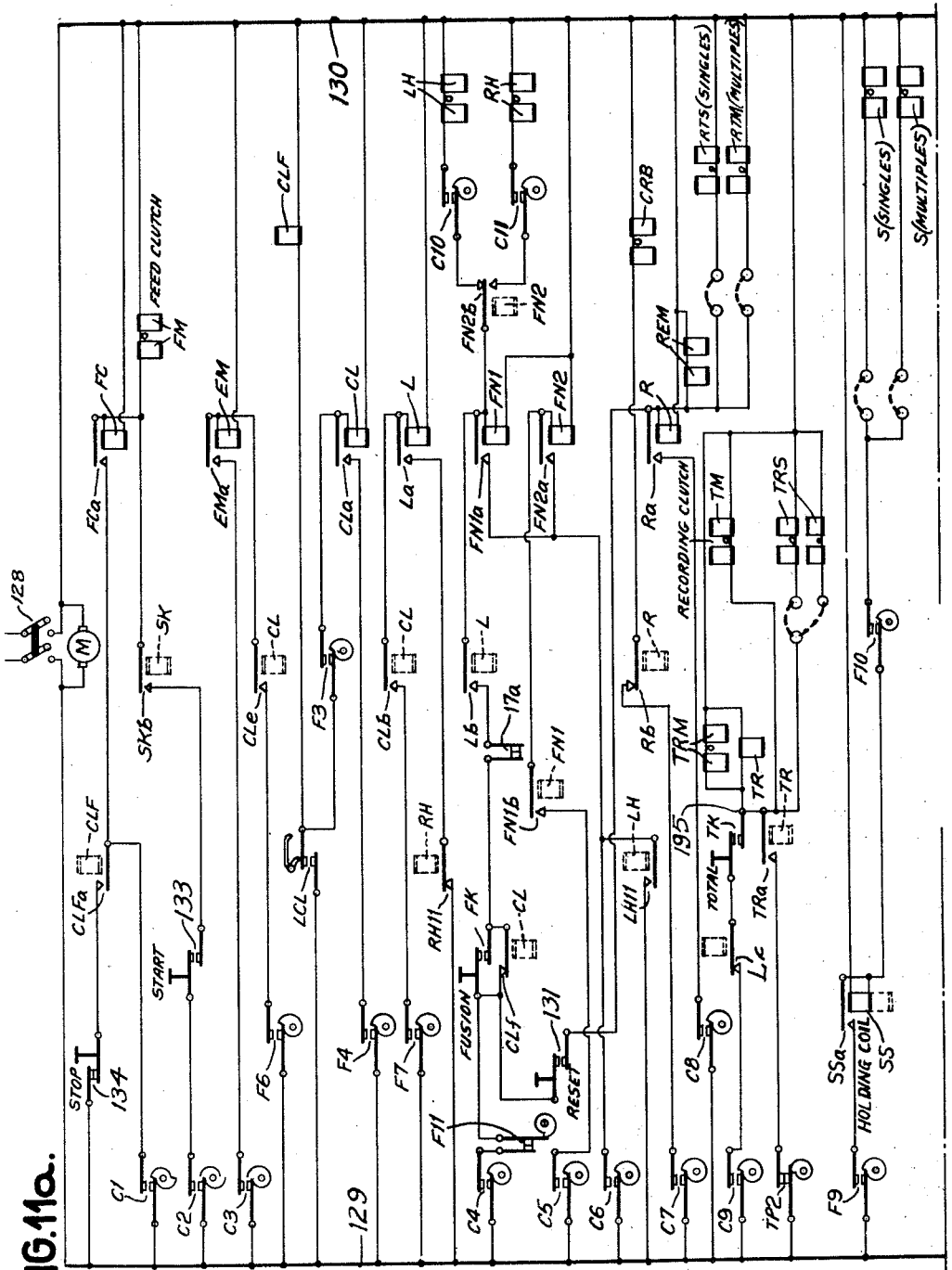

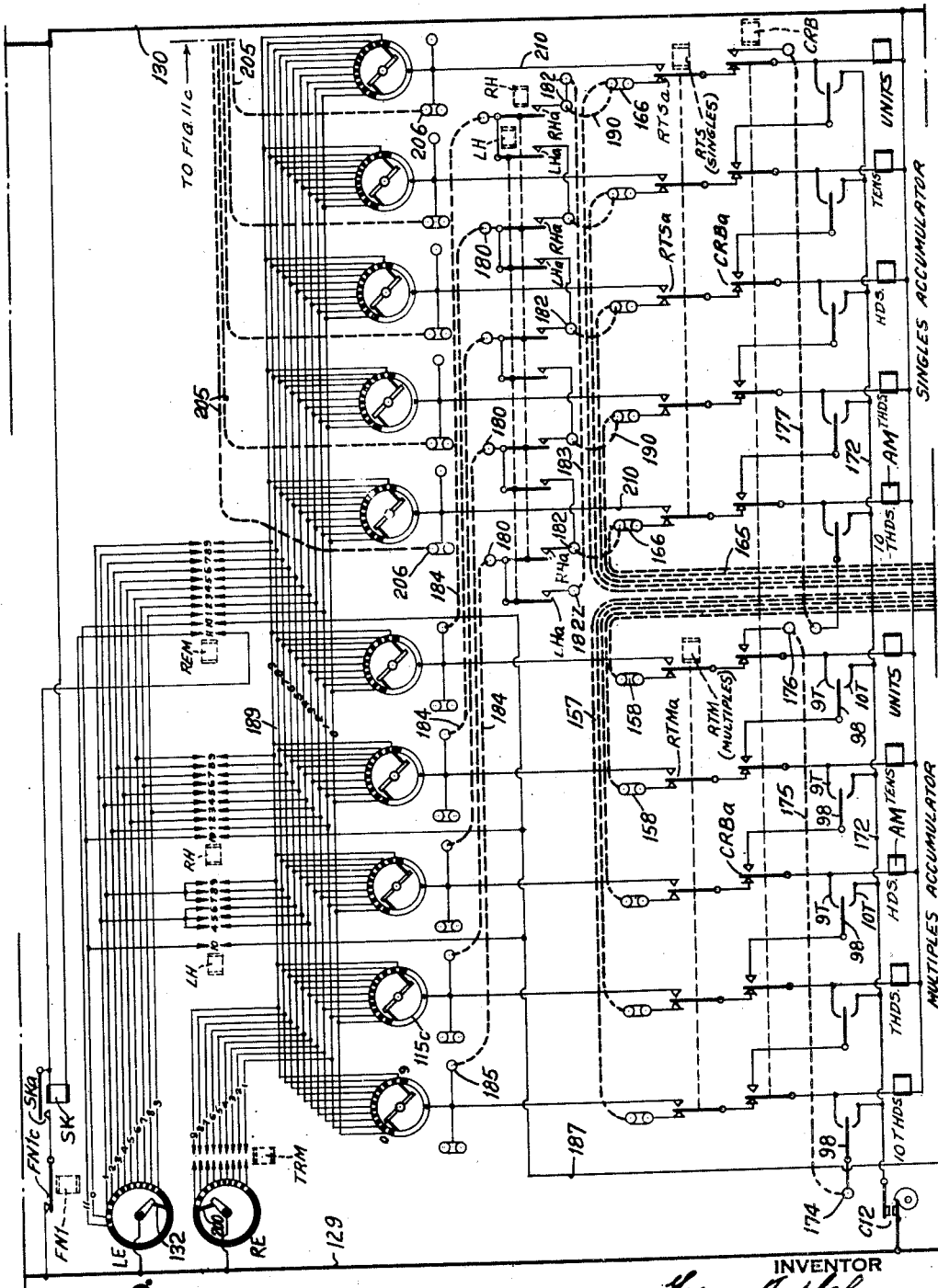

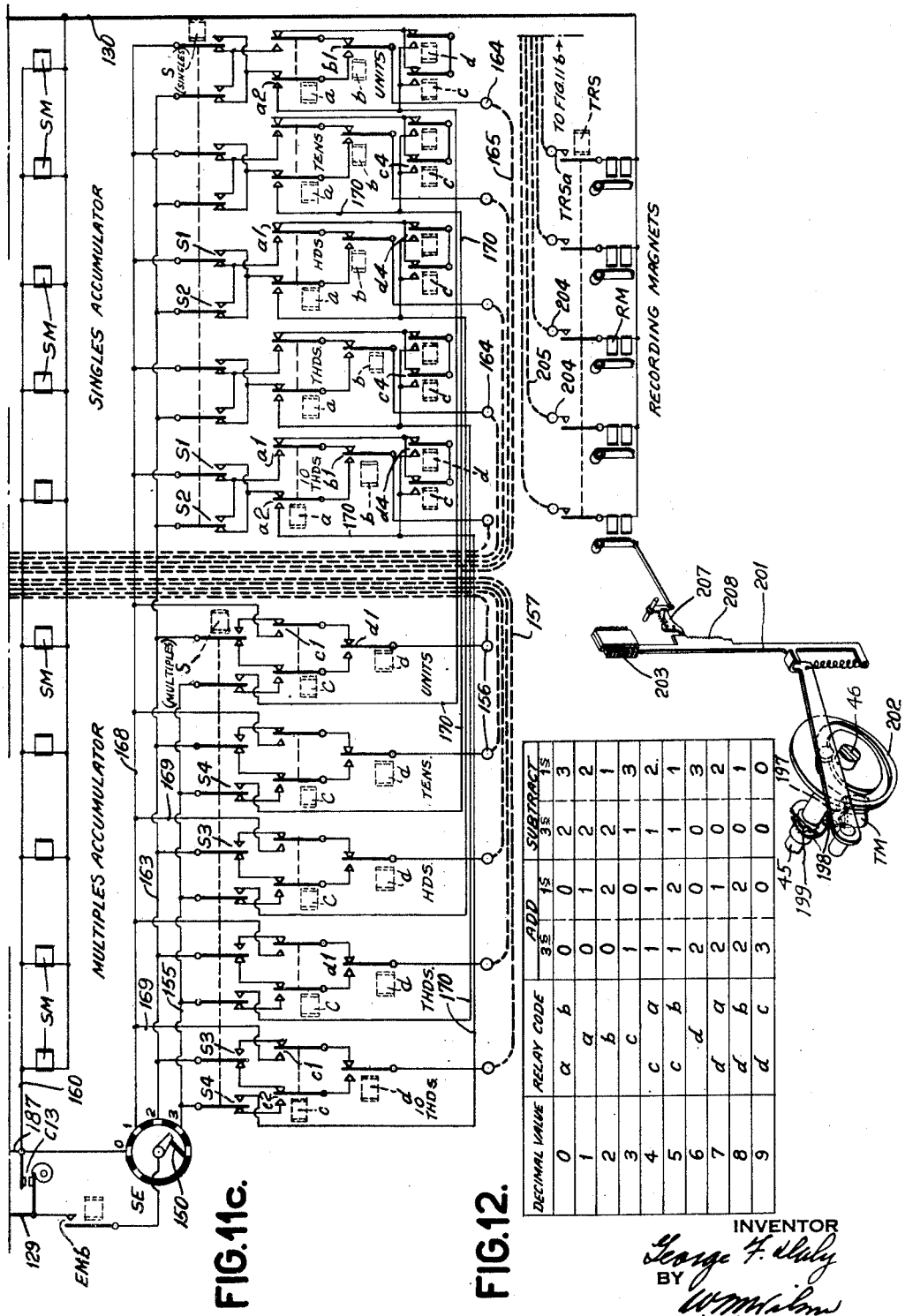

June 5, 1945.  G. F. DALY  2,377,762
ACCOUNTING MACHINE
Filed July 8, 1941   14 Sheets-Sheet 11
FIG.11AA.
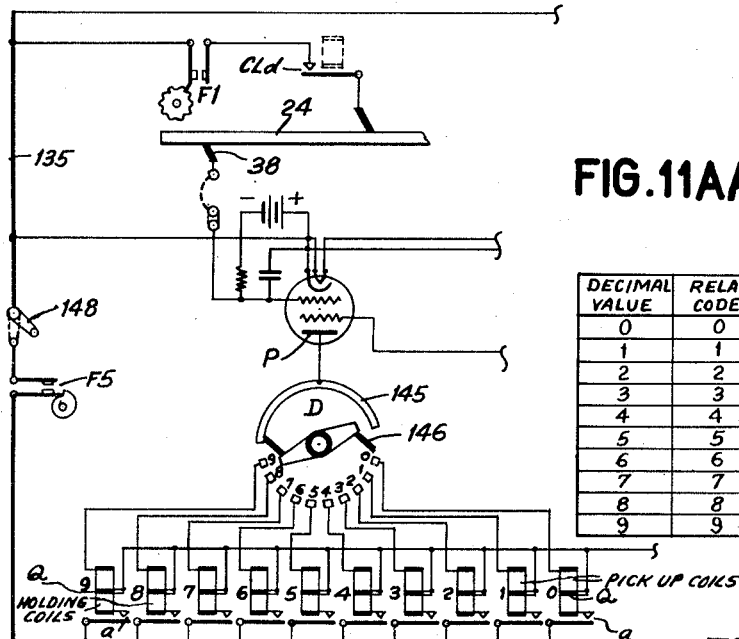
FIG.12a.
| DECIMAL VALUE | RELAY CODE | ADD | | SUBTRACT | |
|---|---|---|---|---|---|
| | | 4d | 1d | 4d | 1d |
| 0 | 0 | 0 | 0 | 2 | 1 |
| 1 | 1 | 0 | 1 | 2 | 0 |
| 2 | 2 | 0 | 2 | 1 | 3 |
| 3 | 3 | 0 | 3 | 1 | 2 |
| 4 | 4 | 1 | 0 | 1 | 1 |
| 5 | 5 | 1 | 1 | 1 | 0 |
| 6 | 6 | 1 | 2 | 0 | 3 |
| 7 | 7 | 1 | 3 | 0 | 2 |
| 8 | 8 | 2 | 0 | 0 | 1 |
| 9 | 9 | 2 | 1 | 0 | 0 |
FIG.11cc.
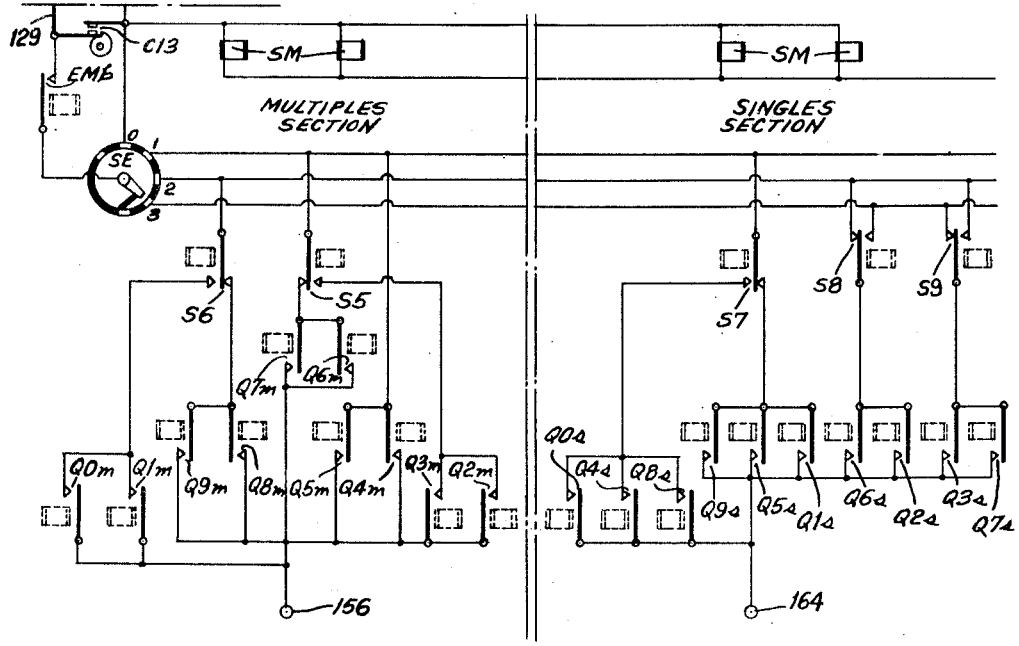
INVENTOR
George F. Daly
BY
ATTORNEY June 5, 1945.  G. F. DALY  2,377,762

ACCOUNTING MACHINE

Filed July 8, 1941  14 Sheets-Sheet 12

Patented June 5, 1945

2,377,762

UNITED STATES PATENT OFFICE 2,377,762

ACCOUNTING MACHINE

George F. Daly, Endicott, N. Y., assignor to International Business Machines Corporation, New York, N. Y., a corporation of New York Application July 8, 1941, Serial No. 401,432

10 Claims. (Cl. 235—61.8)

This case relates to accounting machines with means for accumulating amounts, and particularly to machines with differentially movable accumulators to accumulate amounts derived from control records.

The accumulators are adapted to be driven by cyclically operating drive means. To enter a value in an accumulator order, the drive means is rendered effective to move the accumulator order differentially in proportion to the size of the value. An entry period must be provided sufficient to allow entry of the highest digital value of a notation. In the decimal system, the entry period must be long enough to allow entry of a "9" in an order by a differential movement of nine unit value steps of the order. In the duodecimal system, the entry period must allow for eleven unit steps in at least one order for possible entry of the maximum digital value "11." The speed at which successive amounts may be accumulated by differentially and variable movable accumulators is inversely proportional to the duration of such entry period.

The general object of this invention is to increase the speed at which amounts may be accumulated by differentially driven accumulators by reducing the entry period, but with such reduction not resulting from an increase in the speed at which the accumulators may be driven.

Further, an object of the invention is to provide for entry and accumulation of component values deriving from a parent cardinal series of values, such as the cardinal series of digital values 1 to 9 of the decimal system, with the maximum size component value being smaller than the size of the highest value of the cardinal series, whereby the entry period may be correspondingly shortened.

Further, an object of the invention is to provide separate accumulator banks, each to accumulate different component parts of the parent values.

Further, an object of the invention is to provide for such component entry accumulation while retaining the decimal scheme of carry from one accumulator order to another.

Further, an object of the invention is to provide for fusion of the separate component totals into a single parent cardinal total.

Another object of the invention is to utilize the highest going multiple of a common divisor factor contained in the parent, cardinal value as one component and the remainder as the other component.

The above objects are particularly applicable to record controlled accounting machines. In such machines, values are represented by marking index positions in columns of each record. The records are fed one at a time to sensing means. Under control of the sensing means, the values are entered in accumulators by effecting differential entry movements thereof.

An object of the present invention in connection with record controlled accounting machines is to shorten the entry period for entry of values derived from each record, without increasing the speed at which the differentially movable accumulators are to be driven.

Another object of the invention is to shorten such entry period by entering component values under control of the records, with the component values being smaller than one or more of the parent, cardinal values.

Another object is to convert cardinal, parent values represented on records into derivative component values for entry into the accumulators.

The invention has been applied preferably to a record controlled accounting machine in which the records are sensed while in motion for value representations. One embodiment of the invention operates with Hollerith records punched according to the single-hole Hollerith code to represent the parent, cardinal values. Heretofore, in the stated type of accounting machine, the Hollerith records have been fed in synchronism with the drive of the accumulators and the differential time at which a value representation was sensed determined the differential time of operation of the accumulator for entering the value.

An object of the present invention is to provide means for entering components of values represented on records by the Hollerith code in a manner enabling the records to be fed at a higher speed than the speed at which the entry receiving accumulators are driven.

Another embodiment of the invention handles component value records bearing representations of the derivative components of parent cardinal values. These records are fed in synchronism with the drive of the accumulators. It is an object of the invention to provide for entry of the components represented on the records into separate accumulators.

Additive entries are effected by moving the accumulators correspondingly to the size of the values. Subtractive entries may be made by moving the accumulators correspondingly to the size of the complements of the values. An object of the present invention is to provide means whereby in effecting complemental entry, the accumulators may be moved in accordance with component values deriving from complements of the parent, cardinal, or in accordance with the complement components of natural value components represented on records. Further, an object of the invention is to provide for correct synthesis of the separate totals of natural and complemental entries of components into a fused cardinal total.

More specifically, an object of the invention is to provide an accounting machine in which one accumulator is used as a multiples accumulator to receive entries of multiples of a common divisor factor of parent, cardinal values, while another accumulator is used as a singles accumulator to receive entries of the remainders. For example, if the given factor is 3, the value 7 of the cardinal series will be entered in the multiples accumulator as multiple 2 with the remainder 1 being received in the singles accumulator. The object is, further, to provide for a fusion of the totals of the multiples and the remainders into a single total based on the regular, parent cardinal notation. The fusion operation will involve multiplication of the multiples total by the common factor and entry of the result into the singles accumulator. The singles accumulator will then contain the fused total based on the regular notation. This fused total will be read out and suitably recorded.

The invention, whether embodied in the form using records bearing the parent, cardinal values or in the form using records bearing component values, may employ the same construction of accumulators. Each accumulator order will have ten differential positions 0 to 9 and when an order moves from 9 to or past 0, carry of one to the next order will be effected. Thus, the accumulators will accumulate components and effect carry according to the decimal system. In each embodiment of the invention, the card values will be sensed and components entered in the accumulators during short cycle intervals. Heretofore, it has been necessary to sense values on the records and enter them in the accumulators during long cycle intervals. In the present case, the short cycle is half the length of a long cycle. Hence, the number of cards which may be acted on during a given time in accordance with the principles of the present invention is substantially twice the number of cards which could be handled in the same time by machines operating according to previous principles.

In one embodiment of the invention, the records will be perforated according to the Hollerith code to represent values in the cardinal series. Storage means in the form of coding relays will be provided. For each value bearing column of the record, a set of such relays will be provided. The sensing of a value perforation in the column will serve through a distributor to operate the related relays selectively. A record bearing an amount to be subtracted will have a subtraction control designation, the sensing of which will operate subtraction control means. After all the value index positions of a record have passed the analyzing means, the setting of the storage relays will be read out and entered through a short cycle emitter as a multiple component into the multiples accumulator and as a remainder component into the singles accumulator. The entry control of each accumulator order comprises a start magnet to couple the register wheel of the accumulator order to cyclic driving means so as to start an entry, and a stop magnet to uncouple the register wheel from the driving means so as to terminate an entry. When making an additive entry, the start magnet of an order of one of the component accumulators will be energized through the short cycle emitter at a differential time selected by the coding relays. In making a complemental or subtractive entry, the start magnet will be energized through the short cycle emitter at a differential time selected by the coding relays in conjunction with the subtraction control means.

In another embodiment of the invention, amounts may be represented on the record as the component values in a derived arithmetical notation based on multiples and remainders obtained by dividing the cardinal values by a common factor. In this embodiment, the records and accumulator may operate at the same speed and component value entries be made directly under control of the analyzing means, without intervention of coding relays, into the multiples and singles accumulators. The increase in the number of records acted on during a given time here results from the fact that the records may be considerably shorter since the highest component in the derived arithmetical notation is a fraction of the highest value in the cardinal series. In this embodiment, a complemental entry in an order will be made by energizing the start magnet through the short cycle emitter at a given time selected by subtraction control means, while the stop magnet will be energized under control of the record.

Variations of these embodiments may be provided as will be made clear in subsequent parts of the specification.

Different factors may be used as the basis of the secondary ordinal series. Preferably, a factor is chosen which will provide for entry, during a short cycle, of a multiple or remainder no higher than 3.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a side view of an accumulator plate unit.

Fig. 4 is a section along lines 4—4 of Fig. 3.

Fig. 5 is an end view of the accumulator unit.

Fig. 9a is the first part of a timing chart for the Hollerith card embodiment.

Fig. 9b is a continuation of Fig. 9a.

Fig. 10 shows part of a Hollerith card.

Fig. 11A shows analyzing circuits and coding relay circuits for the Hollerith card embodiment in which cardinal values are resolved into components on a basis of factor 3.

Figs. 11a and 11b show control circuits for the Hollerith card embodiments.

Fig. 11c shows the component entry selecting circuits controlled by the coding relays of Fig. 11A.

Fig. 11AA shows analyzing and coding circuits for another Hollerith card embodiment in which cardinal values are resolved into components on a basis of factor 4.

Fig. 11cc shows the component entry selecting circuits controlled by the coding relays of Fig. 11AA.

Fig. 12 shows the code table for the Hollerith card embodiment based on factor 3.

Fig. 12a shows the code table for the Hollerith card embodiment based on factor 4.

Figures 13, 14, 14A:
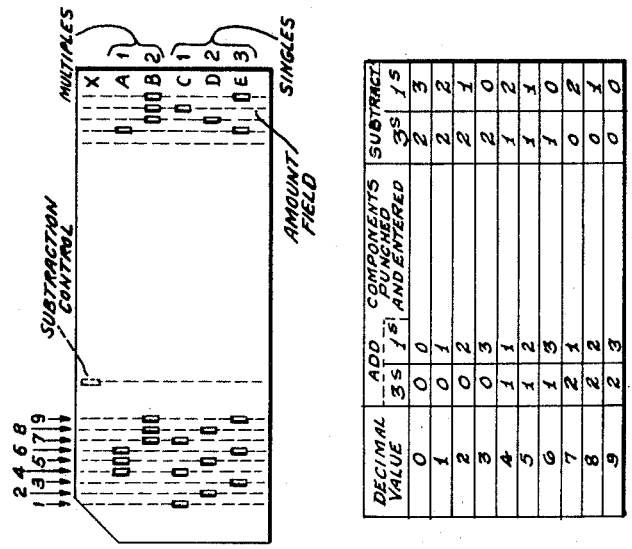

Fig. 13 is a timing chart for the component value record handling embodiment.

Fig. 14 shows a component value record with designations of components derived from cardinal values on the basis of factor 3.

Fig. 14a is a table showing the cardinal values and the corresponding components entered during addition and subtraction.

Figure 15A:
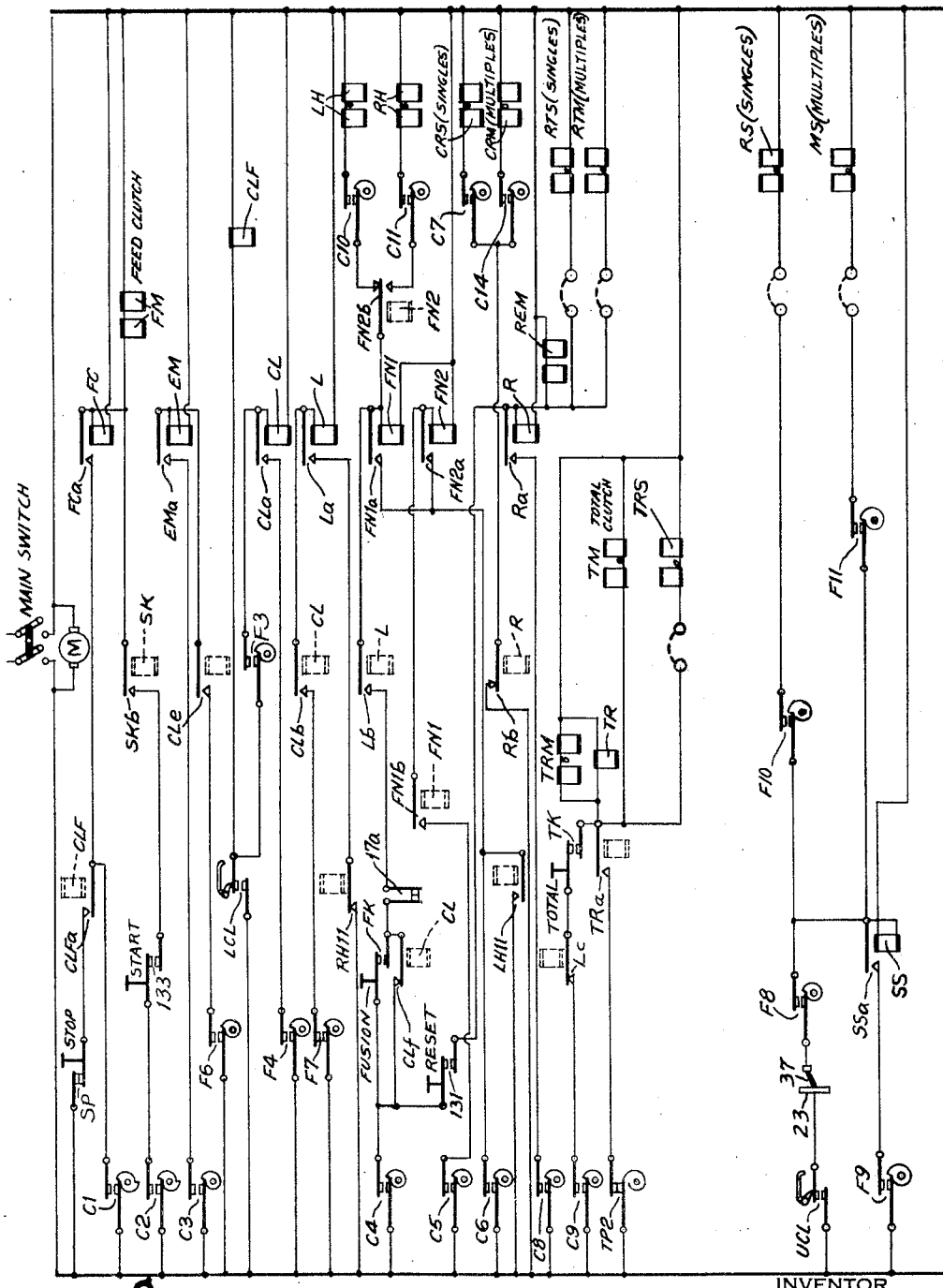
Figure 15B:
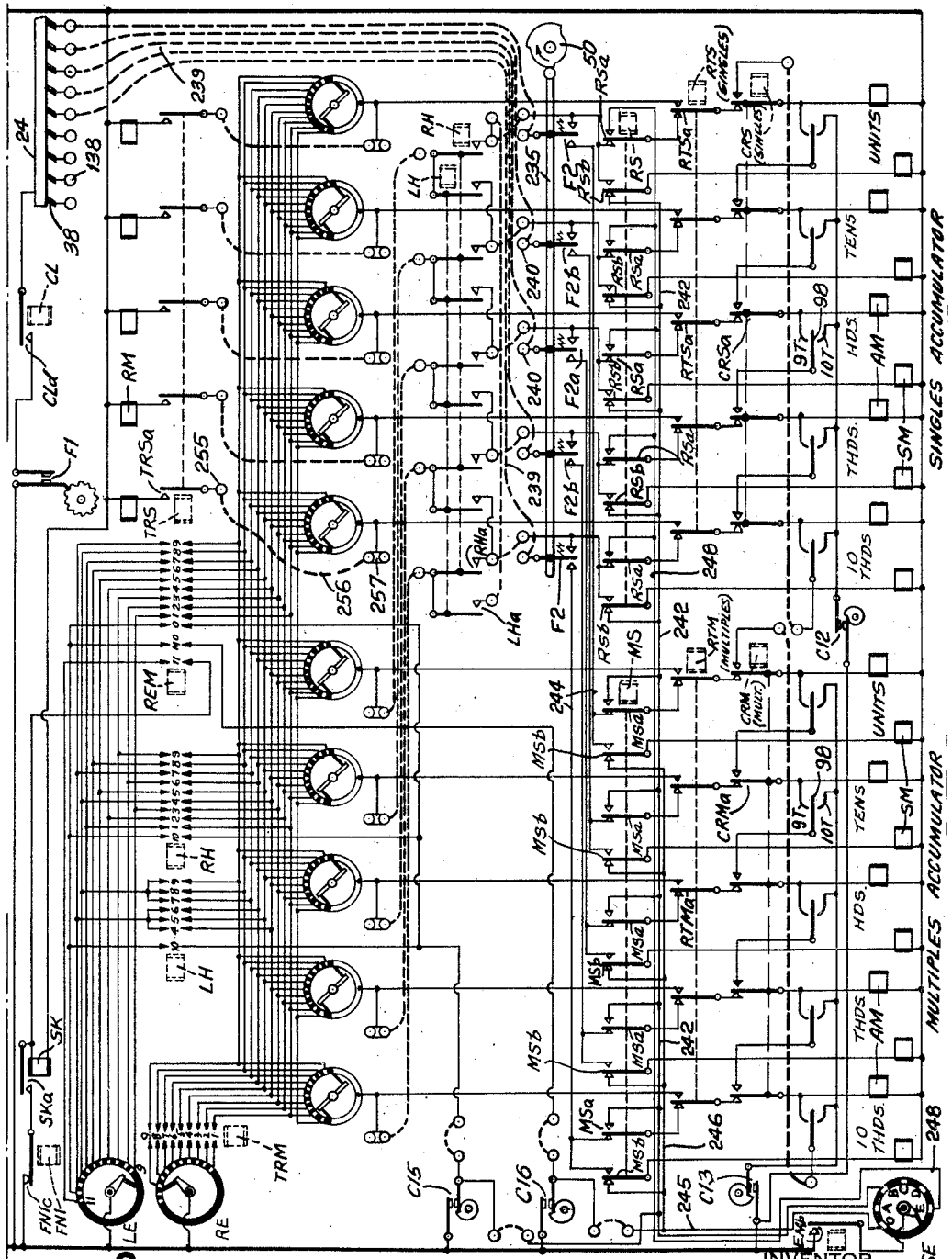

Figs. 15a and 15b show the circuits for the component value record handling embodiment.

Figure 1:
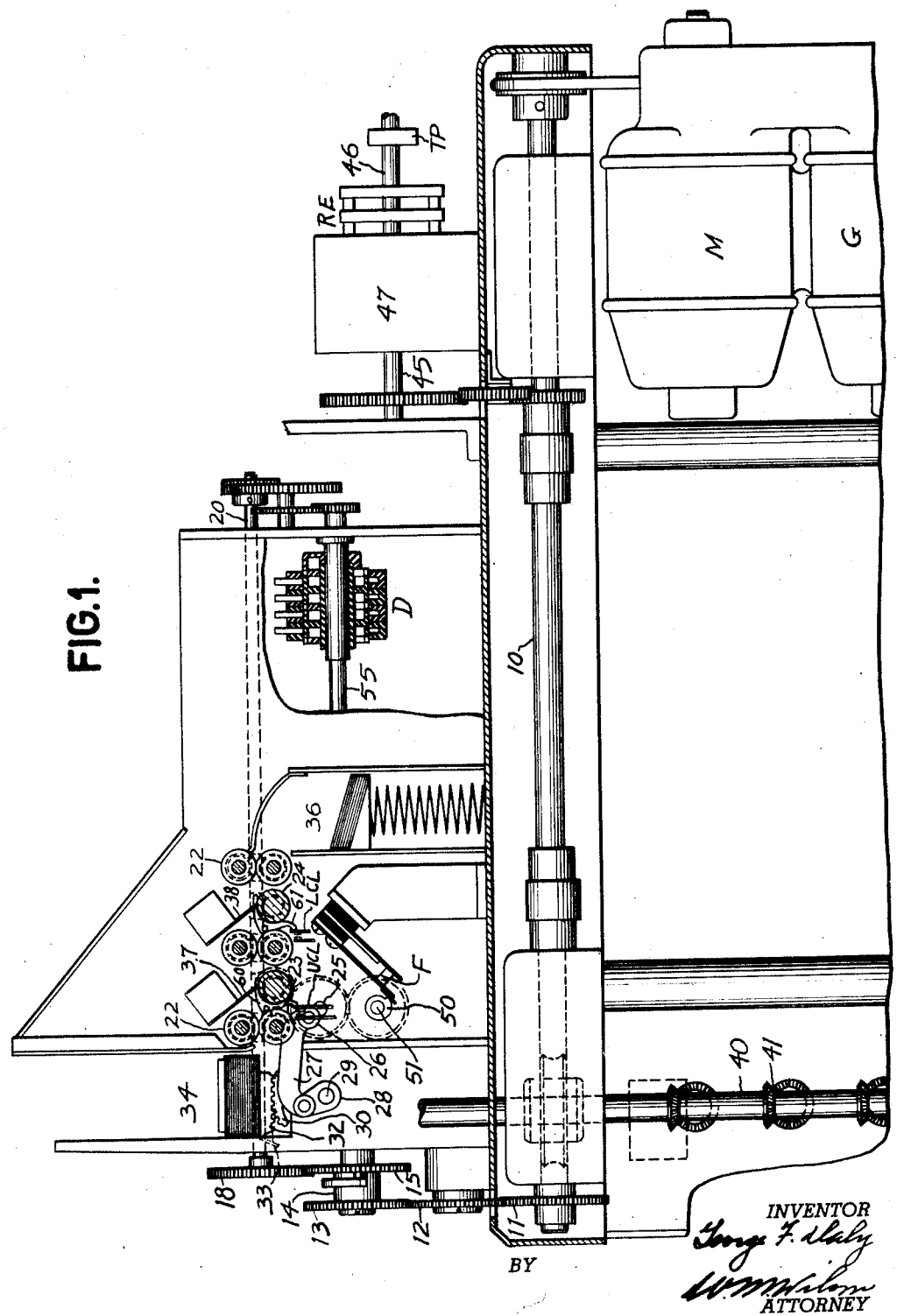
Fig. 1 is an elevation of the machine, including card handling means, involved in my invention.
Figure 2:
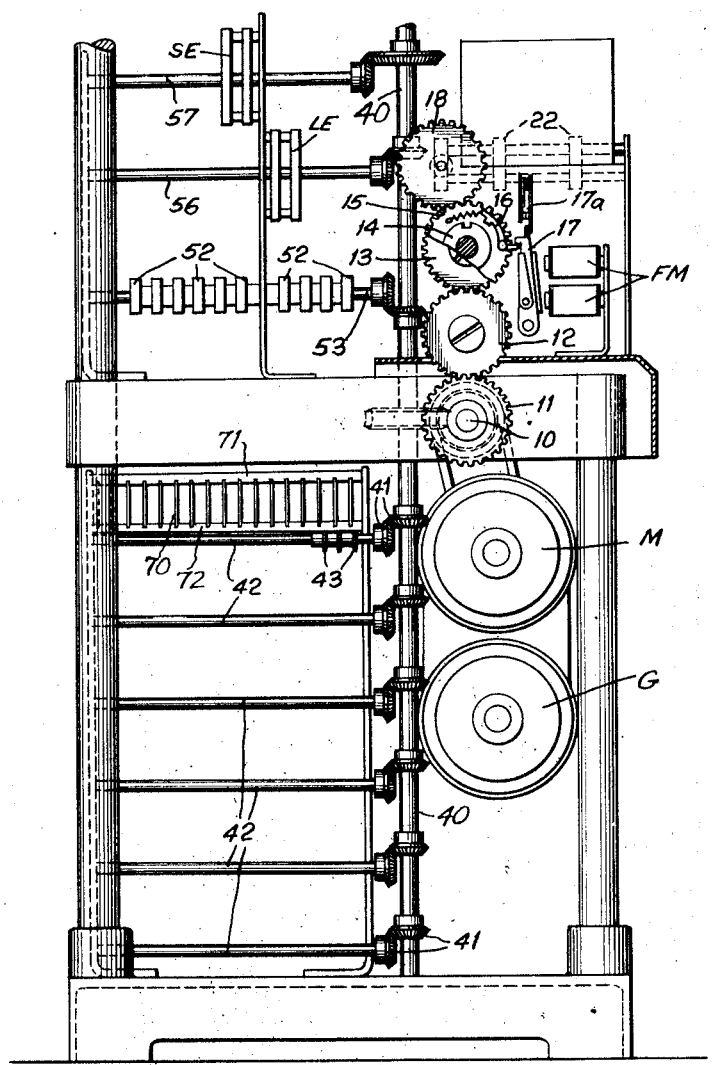
Fig. 2 is an end view of this machine.

Figs. 1 and 2 show the general mechanical structure and arrangement of the parts of a machine for carrying out my invention. The machine has a motor M which through suitable gear reduction and a belt and pulley connection rotates a shaft 10 at the rate of one revolution during a short cycle. A gear 11 at the left end of the shaft serves through an idler 12 to rotate a gear 13 and a single-notched clutch collar 14 rigidly united therewith. Mounted coaxially with the clutch collar is a gear 15 carrying a clutch dog 16 normally latched by armature 17 of a feed clutch magnet FM. Upon energization of this magnet, the armature is attracted and the clutch dog is released to engage the notch in clutch collar 14 and thereby to couple gear 15 to the clutch collar. Incidentally, armature 17, when in attracted position holds a pair of contacts 17a open for a purpose which will be explained later in connection with the circuits. The clutch collar 14 is driven one-to-one by shaft 10; hence, gear 15 when coupled thereto makes one revolution a short cycle. Gear 15 drives a gear 18 on a shaft 20 which is suitably geared to the shafts of feed rolls 22 and first and second contact rolls 23 and 24. The shaft of contact roll 23 is geared to a shaft 25 to drive it through one revolution in a short cycle. Shaft 25 carries an eccentric 26 connected by a link 27 to an arm 28 on a shaft 29. Fixed to the shaft is a gear sector 30 meshed with a rack slide 32, the rear end of which carries a card picker 33. Two such gear sectors, racks, and pickers may be provided side by side. During each revolution of shaft 25, the picker means is reciprocated through the aforesaid connections. On the forward stroke of the picker, it feeds the bottom record card from a supply hopper 34 to the first pair of feed rolls 22. The successive feed roll pairs continue the feed of the card until it drops into a stacker pocket 36. The contact roll 23 and a row of cooperating sensing brushes 37 constitute a first analyzing means for the cards. Contact roll 24 and cooperating sensing brushes 38 provide a second and main analyzing means for the cards. The feed rolls are driven at such a rate as to feed a record card past an analyzing station during a short cycle. The spacing of the first analyzing station from the second analyzing station is such that corresponding index positions of successive records will concurrently reach the first and second analyzing means.

Shaft 10 is geared two-to-one to a vertical shaft 40 which operates bevel gears 41 which rotate a plurality of shafts 42. Shafts 40 and 42 make one revolution in a long cycle, equal to two short cycles. Each shaft 42 has spaced gears 43 for driving accumulators which will be described in detail later. The number of shafts 42 and accumulator rows indicated in Figs. 1 and 2 is merely illustrative and it will be understood that as many more such shafts and accumulator rows are provided as necessary for any desired capacity of the machine.

Shaft 10 is also geared two-to-one to a shaft 45 for driving a recording unit shaft 46 through a recording unit clutch means contained in a box 47. This clutch means is similar to the card feed clutch means and will be explained further in the circuit description. Shaft 46 when clutched to shaft 45 makes one revolution in a long cycle.

A generator G is driven by motor M to supply current at required voltage to circuit lines of the machine. The circuits, to be traced later, include various emitters, distributors, and cam contacts which are generally indicated in Figs. 1 and 2. Those cam contacts effective during card feed are generally designated as F cam contacts and are operated by cams 50 on a shaft 51 geared one-to-one to shaft 25 which makes one revolution in a short cycle. Those cam contacts effective for long cycle operations are generally designated as C cam contacts and are operated by cams 52 on a shaft 53 driven one-to-one by long cycle shaft 40. A plurality of distributors are effective during card feed and are generally indicated by letter D in Fig. 1. The essential structure of the distributors will be understood from the showing in the circuit diagram which will be explained later. Drive is afforded to the rotating parts of the distributors by a two-to-one gearing between the shaft 20 and the drive shaft 55 of the distributors. A recording unit emitter RE has its rotor fixed to recording cycle shaft 46. This shaft also carries a contact control cam TP to operate contacts TP2, shown in Fig. 11a. Driven one-to-one by long cycle shaft 40 is the shaft 56 of a long cycle emitter LE. Also driven by shaft 40, but in one-to-two ratio, is the shaft 57 of the short cycle emitter SE. Between the supply hopper 34 and the first pair of feed rolls is a card lever 60 operated by a passing card to close card lever contacts UCL. Another card lever 61, located near the second contact roll 24, is operated by a passing card to close card lever contacts LCL.

As explained previously, the invention may be practiced in one form with records bearing representations of parent, cardinal values and in another form with records bearing representations of component values. The parent values will be recorded on Hollerith records (see Fig. 10) punched according to the Hollerith code. The represented parent values will be converted through means, including distributors D and coding relays, into component value entries. The component value record (Fig. 14) is half the length of a Hollerith record and designates component values to be entered, without intervening conversion, in the accumulators. The embodiment for handling the Hollerith cards is essentially similar in mechanical nature to the embodiment for handling the component value records. However, there are certain differences, particularly in timing, which will be manifest from the circuit descriptions. In the embodiment for handling component value cards, distributors D may be dispensed with or rendered ineffective. The gear ratio between shaft 20 and feed rolls 22 in the embodiment for handling the Hollerith cards is such as to cause a card to feed in two-to-one relation to the speed of operation of the accumulator drive gears 43. The feed gear ratio in the embodiment for handling component value cards is such as to cause feeding of a card in one-to-one synchronism with the accumulator drive gears. In both embodiments, a card fed out of the supply hopper during a short cycle will reach a position slightly behind the first sensing brushes 37 by the end of the cycle and during the next cycle will be fed to a position slightly behind the second, main sensing brushes 38. In each embodiment, the picker operating shaft 25 will make one revolution and the picker means will feed a card out of the hopper during a short cycle. The cards will continue to be fed during successive short cycles past the analyzing means and to the stacker pocket. The short cycles in which card feed occurs may be referred to as card feed cycles. The short cycle during which a card is sensed for represented values may be referred to as a sensing cycle. The short cycle in which component values are entered may be referred to as the entry cycle.

In the present case, the component value record is half the length of a Hollerith record. It will be understood, however, that two component value records may be provided on one card; for instance, a double deck card, which may be of the same length as the Hollerith card. The dimensions of the supply and delivery magazine and the spacing between analyzing stations and between feed rolls will be suited to the type of card being handled.

In accordance with standard practice, the first analyzing means, including brushes 37 and coacting contact roll 23, serves in conjunction with the second analyzing means, comprising brushes 38 and contact roll 24, to determine whether successive cards have the same group classification and to govern automatic machine control means accordingly. To simplify the present disclosure, the automatic control means has not been shown. Instead, it may be assumed that only one group of cards at a time, of the same group classification, will be placed in supply hopper 34. The amounts represented on this group of cards will be accumulated, and the card feed will then stop due to depletion of cards from the supply hopper. A fusion operation will then be allowed to take place and will be followed by a total taking operation. The second analyzing means is the one which senses the value representations on the records to control the entries into the accumulators. In the embodiment using the component value records, the first sensing station has the additional function of sensing a subtraction control representation. In the embodiment using the regular value records, the subtraction control designation on a card will be detected by the second analyzing station.

The accumulators

The accumulators are constructed as individual units, one of which is shown in Figs. 3 to 8. Each unit includes a drive clutch device, a register device adapted to be clutched thereto, a readout commutator connected to the register device, and control magnets AM and SM, all mounted on a support plate 70. The unit is inserted in the machine by sliding the plate 70 into place between upper guide-slotted frame bar 71 and lower guide-slotted frame bars 72. As the unit is inserted in position, a gear 73 of the drive clutch device moves into mesh with one of the accumulator drive gears 43 (see also Fig. 2). A row of such units is held in position by a cross bar 74 suitably attached to the lower, front frame bar 72.

Gear 73 is fixed to the hub of a drive clutch ratchet 75 which is rotatably carried by a sleeve 76 secured to plate 70. A reduced portion of the hub of ratchet 75 rotatably mounts a disk 77 (see Figs. 4, 6, and 7) having ten teeth 77a around its periphery and formed with a cam edge 77b. Rotatably mounted on fixed sleeve 76 is a register wheel 78 having ten notches 78a around its circumference, each adapted to engage with the upper end of a spring-pressed impositive detent lever 79. The register wheel has ten rotative positions, each corresponding to one of values 0 to 9. When a notch 78a is engaged with detent lever 79, the register wheel is centered in a value position. A carry cam 80 is fastened to register wheel 78 by a pair of pins 82 and 83. These pins project from wheel 78 through openings in the disk 77 to positions adjacent ratchet 75. Pin 82 pivotally carries a clutch dog 84 having a clutch tooth 84a adapted to engage ratchet 75. The free end of the clutch dog is connected to one end of a spring 85 anchored at the opposite end to pin 83. A stud 84b extending from the clutch dog coacts with the cam edge 77b of disk 77. In the positions of the parts shown in Fig. 6, disk 77 is restrained from counterclockwise movement by engagement of a tooth 77a thereof with the tooth 87a of a clutch lever 87. At the same time, the outer portion of cam edge 77b is engaged with stud 84b, preventing spring 85 from rocking clutch dog 84 into coaction with ratchet 75; and the register wheel 78 is at rest in a value position.

Figure 7:
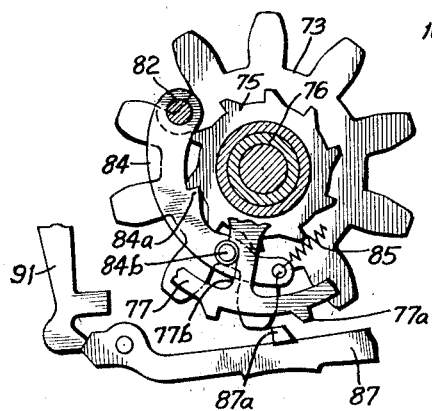
Fig. 7 is a section along lines 7—7 of Fig. 4.
Figure 8:
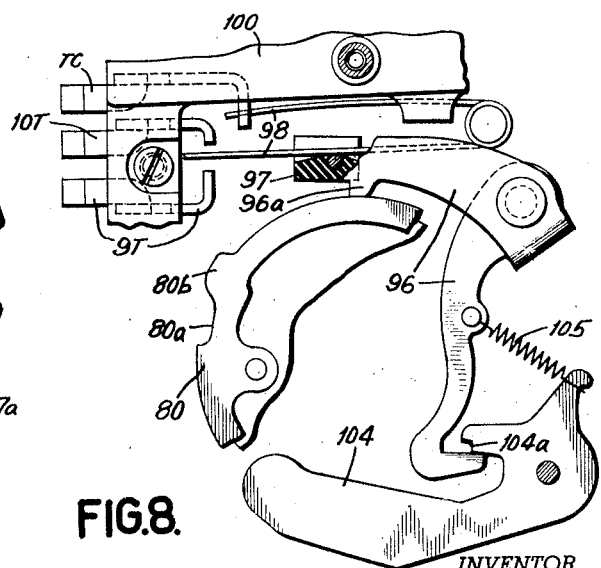
Fig. 8 is a detail view of carry control means.

When clutch lever 87 is rocked counterclockwise, its tooth 87a releases disk 77, and spring 85 is free to rock the clutch dog into clutching engagement with ratchet 75 while stud 84b of the clutch dog rides inwardly along cam edge 77b and cams the disk 77 counterclockwise until the parts are in the positions shown in Fig. 7. The register wheel 78 is now clutched to ratchet 75 for counterclockwise rotation by the accumulator drive gearing 43 and 73. In clutched condition of the parts, disk 77 is forced by engagement of stud 84b with cam edge 77b to rotate together with the register wheel.

To declutch the register wheel 78 from the drive, clutch lever 87 is returned to its clockwise position in which its tooth 87a intercepts a tooth 77a to stop rotation of disk 77. Stud 84b thereupon rides outwardly along cam edge 77b, and the clutch dog 84 disengages the ratchet 75, thereby unclutching the register wheel from the drive. The register wheel stops in a new value position in which it is centered and impositively held by engagement of detent lever 79 with a notch 78a.

Clutching and declutching of the register wheel are controlled, respectively, by advance magnet AM and stop magnet SM. Between these magnets is a common armature 90, pivoted to plate 70 at its upper end and pivotally connected at its lower end to the short arm of clutch lever 87. Energization of advance magnet AM moves armature 90 clockwise which, in turn, rocks clutch lever 87 counterclockwise to release disk 77 and cause clutching of the register wheel to the drive. Energization of stop magnet SM rocks armature 90 counterclockwise, causing the clutch lever to move clockwise and stop the disk 77, with the result that the register wheel is declutched from the drive. The energization of either magnet to move the clutch lever to a related position is momentary, but the clutch lever must be retained in the actuated position until the other magnet is energized. For this purpose, a latch lever 91 is provided. The latch lever is pivotally mounted on a stud 92 carried by a bracket 93 attached to plate 70. A spring 94 urges lever 91 counterclockwise. When the clutch lever 87 is in clockwise, declutching position, its V-shaped free end seats in a notch 91a of the latch lever. Upon energization of advance magnet AM, the clutch lever is rocked counterclockwise, and its free end cams against the inclined bottom of the notch 91a to cam the latch lever 91 aside. As soon as the tip of the clutch lever leaves the notch 91a, spring 94 snaps the latch lever back to a position in which its beveled end abuts the free end of the clutch lever, preventing return of the clutch lever to its clockwise position, as indicated in Fig. 7. The register wheel is now clutched to the drive, and the clutch lever stays in clutching position until stop magnet SM is energized. When magnet SM is energized, it results in the clutch lever being rocked clockwise. In this movement of the clutch lever, its free end cams against the beveled tip of the latch lever 91 to cam the latch lever aside. As soon as the free end of the clutch lever is opposite the notch 91a, the spring 94 snaps the latch lever counterclockwise to cause the notch to receive the free end of the clutch lever. The clutch lever remains in declutching position until magnet AM again is energized.

Figure 6:
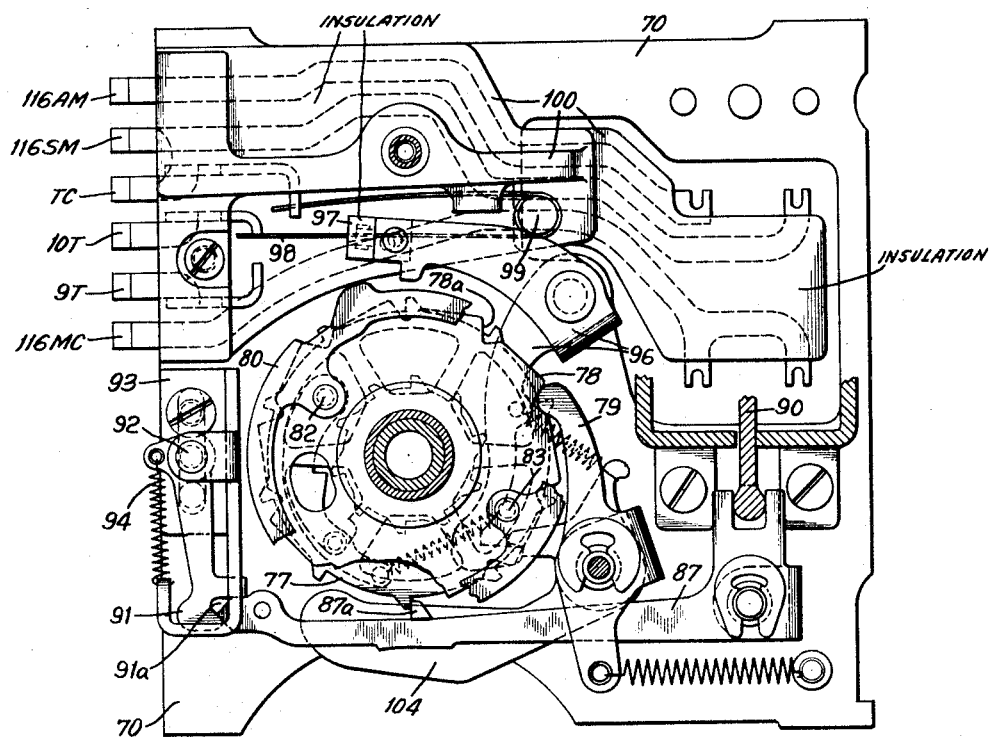
Fig. 6 is a section along lines 6—6 of Fig. 5.

Carry of one from a lower order to a higher order is effected according to the decimal system; i. e., when a lower order passes from "9" to or through "0," one will be carried to the higher order. The carry control includes carry cam 80 fixed to register wheel 78. Coacting with cam 80 is a carry lever 96, the upper arm of which mounts a slotted insulating block 97. Passing through block 97 is the lower leg of a hairpin-shaped contact spring 98. The loop of spring 98 fits over a stud 99 integrally projecting from an insulating moulding 100 fastened to plate 70. The upper leg of spring 98 is anchored to a conductive insert TC set into moulding 100 and serving as the carry common. The lower leg of spring 98 extends between "10" carry contact 10T and "9" carry contact 9T which are in the form of conductive inserts set into moulding 100. Lever 96 has the tip of its lower arm engaged with a latch lever 104. A spring 105 between the carry lever and latch lever tends to rock them towards each other. When the register wheel 78 is in value positions "1" to "8," a circular portion of cam 80 is engaging a lug 96a of lever 96 and the parts are then in the positions indicated in Fig. 8. Upon movement of the register wheel to value position "9," a notch 80a in the cam 80 moves under the lug 96a, permitting the lever 96 to rock counterclockwise and the lower leg of the contact spring 98 to engage the "9" carry contact 9T. Should the register wheel advance to or past the "0" value position, a projection 80b of cam 80 will ride past lug 96a, rocking lever 96 clockwise to cause the lower leg of the contact spring 98 to engage the "10" carry contact 10T, as indicated in Fig. 6. As the lever 96 rocks clockwise, the tip of its lower arm slides into the corner notch 104a of latch lever 104. Latch lever 104 thereby latches the carry lever 96 and carry contact 98 in "10" carry position until carry entry has been completed during the cycle. After carry has taken place, a stud 106 (Fig. 3) extending from one side of drive gear 43 cams latch lever 104 clockwise to release the corner notch 104a from the lever 96. The lever 96 thereupon returns to neutral position shown in Fig. 8.

A readout commutator is provided in each accumulator unit. The readout commutator comprises a collar 110 of insulating material fixed to the hub of register wheel 78. Set into the collar 110 is a conductive plate 111 which carries the opposite commutator brushes 112 and 113. These brushes rotate within an opening in a non-conductive moulding 114 secured to plate 70. Set into moulding 114 are conductive inserts 115—0 to 9 and 115C. Inserts 115—0 to 9 constitute the value segments which are disposed within half the circle of travel of the commutator brushes, while insert 115C is the common segment spanning the opposite half of the circle of brush travel. When the register wheel moves one-tenth of a revolution, it advances a single value step. The value segments are spaced apart half a value step and are arranged in the order 0, 5, 1, 6, 2, 7, 3, 8, 4, and 9. The brushes 112 and 113 are not diametrically opposite but are angularly displaced from a diametrical line, the angular displacement being equal to the angular spacing between a pair of adjacent value segments. Hence, upon advance of the register wheel from one value position to the next, a brush 112 or 113 moves across an intermediate value segment to the next higher value segment. For example, with brush 112 engaged with the "0" value segment, a step of advance of the register wheel causes the brush to move past the "5" value segment into engagement with the "1" value segment. When the register wheel moves from "4" value position to "5" position, brush 112 moves past the "9" value segment and onto the common segment while brush 113 moves from the common segment, past the "0" segment, to the "5" segment. Thus, any value position of the register wheel is reflected or manifested by one of the commutator brushes engaging with the corresponding value segment while the opposite brush is engaged with the common segment.

The leads to the magnets AM and SM are in the form of conductive inserts set into the moulding 100. These inserts are designated 116AM, 116SM, and 116MC, and are respectively the lead to the advance magnet AM, the lead to the stop magnet SM, and the common lead to both magnets.

The conductive inserts, including the carry terminals TC, 10T and 9T, the readout commutator inserts 115, and the leads 116 extend beyond the mouldings 100 and 114. Attached to the frame bars 71 and 72 is a moulding 118 of insulating material. Hollow plugs 119 carried by moulding 118 have spring ends engaging the projecting ends of the inserts. Electrical connections between the accumulator unit and the circuits is made by inserting plug wire tips (not shown) into the plugs 119.

The different embodiments of the invention will be described further with relation to their circuits. There are two main forms of the invention, one using component value representing records and the other using cardinal value representing records; specifically, Hollerith cards. The form of the invention using Hollerith cards may be subdivided into two Hollerith card embodiments. One such embodiment uses combinational coding relays operated singly and in combination to resolve the cardinal values into component value entry selections. The other Hollerith card embodiment uses coding relays operated singly to resolve the cardinal values into component entry selections.

*The Hollerith card.*—Fig. 10 shows a portion of a Hollerith card. The card has parallel columns, each with digital index positions 9 to 0. A single perforation in a column in one of these index positions denotes the corresponding cardinal value. A plurality of these columns may be grouped to form an amount field, in which the columns have definite denominational order relationship. One card column is set aside to contain a classifying perforation to classify the amount designated on the card as a positive or negative amount. The classifying perforation in this case is a 9 perforation, the presence of which in the specially assigned column indicates that the amount designated on the card is to be subtractively entered. Such entry will be in the form of a complement.

The classifying designation will be sensed by one of the brushes 38 of the second analyzing means.

The first analyzing means will not be shown in the circuits of the Hollerith card embodiments as this analyzing means will serve merely as part of the group control means which, as explained before, need not be shown or described in connection with the present invention.

*The Hollerith card embodiment using combinational coding relays*

Figure 9B:
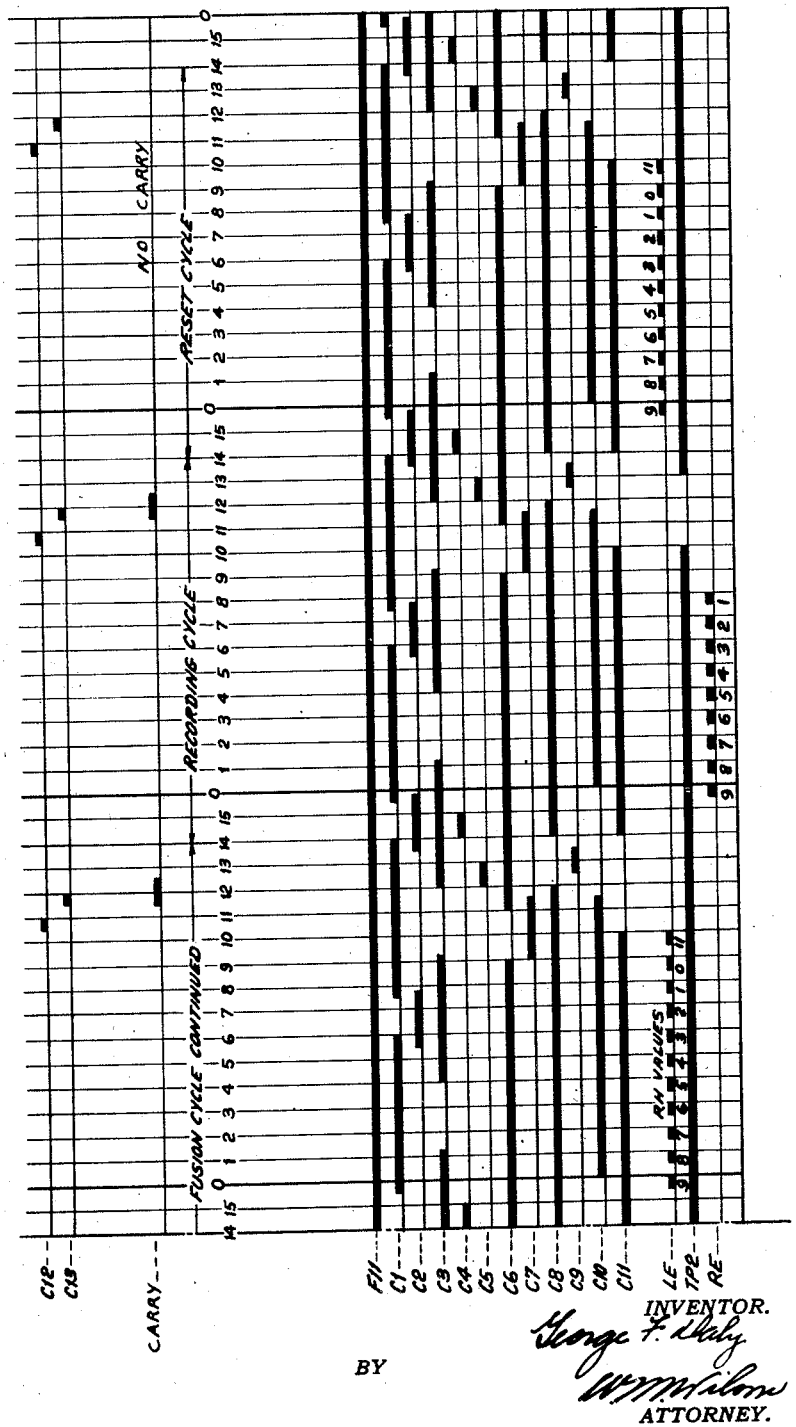

Fig. 11A shows the analyzing and coding circuits for this embodiment. Figs. 11a and 11b show the control circuits associated with this, as well as with the other Hollerith card embodiment. Fig. 11c shows the component value selection circuits for this embodiment, and Fig. 12 shows the combinational coding table indicating the relation between the decimal values, the combinational coding relays, and the components for additive and subtractive entries. It will be noted from Fig. 12 that the common factor used for this embodiment is the factor 3. The timing chart for this embodiment is shown in Figs. 9a and 9b.

Referring to Fig. 11a, the closure of a main switch 128 connects opposite circuit lines 129 and 130 to a suitable source of current. Motor M is directly across the circuit lines and is set in operation upon closure of the main switch. The parts driven by the motor without intervening clutch means are now constantly running.

Having placed a group of Hollerith cards in the supply hopper 34 (Fig. 1), the operator depresses the Reset Key (Fig. 11a). Upon the next closure of cam contacts C4 (Fig. 9a), a pickup circuit is completed from line 129 via cam contacts C4 and F11 and reset key contacts 131 through relay coil R and magnet REM in parallel to the opposite line 130.

Coil R closes contacts Ra to provide a stick circuit timed by cam contacts C8. Magnet REM closes the REM contacts shown in Fig. 11b. The only one that need be considered for the present is contact REM11. When the brush 132 of the long cycle emitter LE reaches emitter spot 11, a circuit is established from line 129 via the brush and 11 spot of this emitter and contacts REM11 through a start relay coil SK and to line 130. Contacts SKa close and establish a stick circuit through fusion relay contacts FN1c. This stick circuit will remain closed until a fusion cycle is initiated. During the fusion cycle, contacts FN1c are opened to break the stick circuit of coil SK.

By requiring a reset cycle as a condition to operation of relay coil SK, card feed will be prevented until at least the multiples accumulator has been reset to zero, ready to receive entries of multiples derived from the new group of records.

To start the card feed, the operator depresses the Start Key (Fig. 11a). Upon the next closure of cam contacts C2 (Fig. 9a), a circuit is completed via these cam contacts, the start key contacts 133 and the start relay coil contacts SKb through the feed clutch magnet FM and relay coil FC in parallel. Cam contacts C2 are operated by a suitable double lobe cam and close twice during a long cycle, once at the 5th cycle point and again at the 13th cycle point. Depending upon whether the start key is depressed at the first or second closure time of the cam contacts C2, the card feed clutch magnet FM will cause card feed to start either at the 8th cycle point or at the beginning of a long cycle. The first card reaches a position slightly behind the first set of brushes 37 (Fig. 1) by the end of the first card feed (short) cycle which is half a long cycle. The start key is depressed long enough to cause a second card feed cycle to take place at the end of which the card is slightly behind the second set of brushes 38. During the second card feed cycle, the card causes card lever contacts LCL to close. The closing of these contacts forms a circuit through a coil CLF (Fig. 11a). Contacts CLFa close and, with contacts FCa and stop key contacts 134 also closed, a first shunt circuit is completed through coil FC and magnet FM. The start key may now be released and cards will continue to feed until the supply is exhausted or until the stop key is depressed. A second shunt circuit for coil FC and clutch magnet FM extends through cam contacts C1 which, when they open, after the first shunt circuit is broken, time the ultimate denergization of the coil and clutch magnet. The card feed will stop either at the 8th point or at the end of a long cycle, depending upon whether the first shunt circuit opened during the first or second half of a long cycle.

At the beginning of the third card feed cycle, the first card is about to move through the second analyzing means. The third card feed cycle is, therefore, the first card sensing cycle indicated in Fig. 9a. When cam contacts F3 close at the beginning of the first sensing cycle, a pickup circuit, extending also through now-closed card lever contacts LCL, is made through a coil CL (Fig. 11a). Contacts CLa close and together with cam contacts F4 provide a stick circuit for coil CL. The pickup circuit for this coil and its stick circuit will be made in this manner each effective sensing cycle.

Referring to Fig. 11A, the contact roll 24 of the second analyzing means is connected to current line 135 through relay contacts CLd and circuit breaker F1. Power is placed on line 135 and opposite line 136 by closure of a switch 137 connecting the lines to a current supply provided by generator G (Fig. 1). Each sensing brush 38 is wired to a plug socket 138 connectible by a plug wire 139 to a plug socket 140. The plug sockets 140 are wired to the control grids G of vacuum tubes. The heated cathodes K of these tubes are connected to line 135 and a battery B biases the control grids negative with respect to the cathodes. Each tube also includes a screen grid SG connected through a circuit breaker F2 to line 136. The plates P of certain of the tubes are connected to distributors D (also see Fig. 1). The plate P of one of the tubes is connected via cam contacts F8 to the pickup coil of a relay magnet SS. The brushes 38 for sensing the columns of the amount field are associated through the described plug connections with the tubes whose plates are wired to distributors D. The brush 38 for sensing the subtraction classifying card column is associated similarly with the tube whose plate is wired to cam contacts F8.

The Hollerith records are fed at such a rate as to pass two index positions of a column across the column sensing brush during one long cycle point interval. Circuit breakers F1 and F2 each make twice during a long cycle point interval to time the make and break of the sensing circuits. When a brush 38 senses a perforation, the tube reacts in the normal way to pass current from line 135 to the plate P of the tube.

*Subtraction relay control.*—The subtraction control perforation in the present embodiment is a 9 hole in the classifying column. The sensing of this hole causes current to pass from line 135 to the plate P of the tube connected to the brush for sensing the classifying column and, from this plate, the current is transmitted via contacts F8, closed at the 9 hole sensing time, through the pickup coil of relay magnet SS to line 136. Referring to Fig. 11a, the pickup coil closes stick contacts SSa which together with cam contacts F9 complete a circuit through the holding coil of relay magnet SS. As is well known, the holding coil of such dual wound magnet maintains the stick contacts closed, so that the holding coil of magnet SS will be energized until contacts F9 open near the end of the sensing cycle. When cam contacts F10 close, parallel shunt circuits are made through relay magnets S. These magnets control relay contacts S1, S2, S3, and S4 in the component entry selection circuits (Fig. 11c) and will cause complement components to be selected by the coding relays.

*The coding relays.*—Four coding relays *a, b, c,* and *d* are provided for each amount column. Each such set of coding relays is operated under control of a pair of distributor units D (see Fig. 11A). Each pair of distributor units has its common segments 145 connected in parallel to the plate P of a vacuum tube associated with the brush 38 for sensing an amount column. Each distributor unit has a pair of brushes 146 carried, through insulation, by the distributor shaft 55 (see also Fig. 1). This shaft is driven one-to-two by the short cycle shaft 20, so that the brushes 146 make one revolution in two card sensing (short) cycles. During one sensing cycle, one of the brushes 146 wipes common segment 145 while the opposite brush successively engages individual value segments 9, 8, 7 . . . 0 of the distributor unit. During the next sensing cycle, the functions of the brushes are interchanged. The index positions 9 to 0 of a card pass the brushes 38 in this stated order. The segments 9 to 0 of a distributor unit are engaged by a distributor brush in the same order and in synchronism with the passage of positions 9 to 0 of the card past sensing brushes 38. When the brush 38 of an amount column senses a perforation in one of the positions 9 to 0, the output voltage of the vacuum tube associated with this brush is impressed on the common segments 145 of the connected pair of distributor units.

The pickup coils of the set of coding relays *a, b, c,* and *d* are wired, in the manner indicated in Fig. 11A, to the value segments 9 to 0 of the related pair of distributor units. For each cardinal value perforation sensed in the amount column, one or more of the pickup coils of relays *a, b, c,* and *d* are energized. Fig. 12 indicates which coding relays are operated for each sensed perforation. For instance, relays *a* and *d* are placed in action by the sensing of a 7 perforation. The sensing of this perforation occurs at the same time as the brushes 146 of the distributor pair are engaged with the 7 segments of the distributor units of the pair. The sensing of the 7 perforation by a brush 38 causes current to pass from line 135 to the plate P of the tube associated with the sensing brush 38. The plate current proceeds in parallel through the common segments 145 of the related distributors, brushes 146 and the 7 segment of the left hand distributor unit of the pair, through the pickup coil of relay *d* and to opposite line 136. From the common segment of the right hand distributor unit of the pair the plate current proceeds via the brushes 146 and the 7 segment thereof through the pickup coil of relay *a* and to line 136.

In a similar manner, the sensing of any other value perforation in an amount column causes the pickup coil or coils of a coding relay or relays to be energized according to the code shown in Fig. 12.

When a pickup coil of a coding relay *a, b, c,* or *d* is energized, it closes its stick contacts *a*3, *b*3, *c*3, or *d*3 to complete a circuit through the companion holding coil. These holding coils circuits also extend in common through a hand switch 148 and cam contacts F5 which remains closed till the end of the sensing cycle.

The coding relays *a, b, c,* and *d* and the subtraction control relays S may be grouped as component selecting means. When relays S are not operated, the coding relays alone select the multiples and singles components under the heading "Add" in the code table, Fig. 12. When relays S as well as the coding relays operate, the multiples and singles components under the heading "Subtract" are selected. It will be noted that the components given in the table are derived on the basis of factor 3. As will be clear from the description subsequently given of the second Hollerith card embodiment, any other suitable factor may be used. The multiples components are to be entered in a multiples accumulator and the singles components in a singles accumulator (see Figs. 11b and 11c). The transmission of selected component entries is under control of short cycle emitter SE (Fig. 11c). The emitter has four active spots for this embodiment which are designated conveniently as 3, 2, 1 and 0. The brush 150 of the emitter successively wipes these spots at long cycle point intervals apart. Such engagement recurs each entry cycle (Fig. 9a) which is of the duration of a short cycle and lags the related sensing cycle by five long cycle points. After the positions 9 to 1 of a card have been sensed and while position 0 is being sensed, the brush 150 engages spot 3. By then, all the selecting relays have been selectively set according to the value designations sensed in the amount field of the card. The setting of the selecting relays is maintained while the emitter brush engages spots 3, 2, and 1, after which the setting is dropped as a result of the breaking of the holding circuits of the holding coils of the entry selecting relays by the opening of cam contacts F5 and F9 and F10. Shortly after the setting of the selecting relays is dropped, the sensing of the index positions of the next card begins to determine a new setting of the entry selecting relays. Thus, in the interval between the sensing of one card and the sensing of the next card, the brush 150 wipes spots 3, 2, and 1. The engagement of the brush with the spots 3, 2, and 1 initiates entries of 3, 2, and 1 component values. The entry operations, once initiated, proceed to completion independently of the component selecting relays and initiating means and overlap the sensing of index positions of the next card. Likewise, carry operation may be initiated during a portion of the entry cycle overlapping the next card sensing cycle. It is merely necessary to terminate all carry and entry operations before the emitter brush 150 again engages the 3 emitter spot to initiate entries under control of the new setting of the entry selecting relays. In this manner, the sensing cycles may be continuously performed and the entry cycles also be continuously performed but in lagging and overlapping relation to the sensing cycles.

The transmission of entries under control of the short cycle emitter is effective only during card feed cycles, beginning with the one in which the first card is about to pass under the sensing brushes 38. It will be recalled that coil CL is energized upon closure of cam contacts F3 at the beginning of the third sensing cycle which is the first effective card sensing cycle. The coil CL then is held by stick contacts CLa and cam contacts F4 until near the end of the sensing cycle. The pickup and holding circuits of coil CL will be formed in this manner every sensing cycle. Coil CL closes contacts CLe (Fig. 11a) and upon closure of cam contacts F6, a pickup circuit is formed through a coil EM. Coil EM closes stick contacts EMa to provide a holding circuit extending through contacts C3. This circuit remains in effect during the successive engagement of emitter spots 3, 2, 1 and 0 by the emitter brush 150 of the short cycle emitter and is then dropped by the opening of contacts C3. When the last card is passing the sensing brushes 38, card lever contacts LCL open and when cam contacts F4 also open, coil CL is deenergized and will not be picked up again during the next card feed cycle. However, the pickup circuit of coil EM will be established during the last sensing cycle and render the short cycle emitter effective to initiate entry transmission of components resolved from the values represented on the last card. Since the coil CL will not be energized during the next card feed cycle, coil EM will not again pick up and the short cycle emitter will be rendered ineffective to transmit entries.

Several examples of component entries will now be given, considering, for the sake of simplicity, only one order of the amount designated on the card; for example, the units order. Assume that the card does not have a subtraction control perforation 9, so that the amount represented thereon is to be additively entered in the form of components, and relays S are not operated. Now, if the units order column of the amount field of this card bears a 9 perforation, units order relays $c$ and $d$ (see Fig. 12) will be operated. When the emitter brush 150 engages the 3 spot, the following circuit is established.

*Multiple component entry initiation.*—The line 129 (Fig. 11c), contacts EMb, the brush 150, the 3 spot, the 3 common line 155, the normally closed side of contacts S4 and now-closed sides of contacts $c2$ and $d1$ of the units multiple section, thence to plug socket 156 and through a plug wire 157 to the units order plug socket 158 of the multiples accumulator (Fig. 11b) and by way of the normally closed sides of contacts RTMa and CRBa through magnet AM and to line 130.

Energization of magnet AM causes the register wheel 78 to be clutched to the accumulator drive means in the manner previously described. Three long cycle points later, the register wheel is declutched by energization of stop magnet SM. The energization of the stop magnets results from engagement of emitter brush 150 with the 0 emitter spot, this engagement closing branch circuits through all the stop magnets. During the three long cycle points between clutching and declutching of the units multiples order register wheel, multiple 3 is entered therein. This is one-third the number of long cycle points required for entry of cardinal value 9 from which multiple 3 was derived. Thus, by entering the multiple 3 instead of the parent value 9, a considerable saving in entry time is effected.

There is no remainder component for cardinal value 9 and energization of relays $c$ and $d$ does not close any singles entry circuit.

It should be noted that relays $a$ and $b$ select singles entries only and relays $c$ and $d$ select multiples entries except in the case of a 3 subtraction or complement component. In dealing with the additive values, the relays $c$ and $d$ do not select singles entries.

Assume that a card bearing an additive amount has an 8 perforation in the units order. The sensing of the 8 perforation operates units order relays $b$ and $d$. The operation of relay $d$ causes entry of multiple 2 to be initiated by a circuit extending from the brush 150 and emitter spot 2 through a line 163, the normally closed sides of contacts S3 and $c2$ and the now-closed left side of contacts $d1$ of the units order and from there as in the previous circuit through an advance magnet of the units order of the multiples accumulator. Two long cycle points later, the brush 150 engages spot 0 and the stop magnets are energized. Thus, multiple 2 will be entered in an order of the multiples accumulator as a result of the sensing of the 8 perforation in the corresponding column of a card. The operation of units order relay $b$ causes entry of singles 2 by a circuit extending from the brush 150 and emitter spot 2 through line 163, the normally closed sides of contacts S2 and $a2$ and via the now-closed left side of the contacts $b1$ of the units order to a plug socket 164, thence through a plug wire 165 to a plug socket 166 (Fig. 11b) and via the normally closed sides of contacts RTSa and CRBa through the advance magnet AM of the units order of the singles accumulator. Thus, remainder 2 will be entered in the singles order corresponding to the column bearing the sensed 8 perforation. The 8 value represented in the card column is thus resolved into multiples component 2 and singles component 2 entered in corresponding orders of the multiples and singles accumulators.

As another example, assume the sensing of value perforation 3 in a card column of an additive amount bearing card. The sensing of this perforation causes operation of relay $c$ of the corresponding order. When the brush 150 reaches emitter spot 1, an entry initiating circuit is completed through line 168, a line 169 the now-closed left side of contacts $c1$ of said order, the right, normally closed side of contacts $d1$ of the same order, thence in the same manner as described, through magnet AM of the said order of the multiples accumulator. One long cycle point later, the stop magnets are energized. Thus, multiple component 1 has been entered in an order of the multiples accumulator as a result of the sensing of the 3 perforation.

It may be understood now that with relays S unoperated, operation of both relays c and d of any order causes entry, in the corresponding order of the multiples accumulator, of multiple 3 deriving from cardinal value 9, operation of relay d, without accompanying operation of relay c, causes a multiple 2 entry deriving from either cardinal values 6, 7, or 8, and operation of relay c, without accompanying operation of relay d, causes a multiple 1 entry deriving from either cardinal value 3, 4, or 5. Further, operation of relays a and b at the same time (resulting from sensing of a 0 perforation) prevents singles entry, operation of relay a, unaccompanied by operation of relay b, causes entry of singles entry 1 deriving from cardinal value 1, 4, or 7, and operation of relay b, unaccompanied by operation of relay a, causes a 2 singles entry deriving from cardinal value 2, 5, or 8.

When the card has a 9 subtraction control perforation, relays S are operated, as explained before. The amount on the card will then be resolved into complementary components. These complementary components will correspond to the "nines" complements of the card designations. For example, the complementary components of cardinal value 8 are multiple component 0 and singles component 1. The synthesis of these components is cardinal value 1 which is the "nines" complement of represented value 8. The complementary multiple of values 3, 4, and 5 is 1 which is the same as the natural multiple component. For this reason, the 1 entry transmitting line 168 is connected to each of relay contacts c1 directly through an unbroken line 169. The relay c will be operated as a result of sensing of cardinal values 3, 4, and 5 and whether these cardinal values are to be added or subtracted, they are resolved into components including multiple 1.

The sensing of a 0 perforation operates relays a and b. If the amount on the card is to be added, relays S are not operated. In such case, the concurrent operation of relays a and b is ineffective to cause any component entry to be made. If, instead, the amount is to be subtracted and a 0 perforation in an amount column is sensed, relays a and b together with operated relays S cause a complement singles component 3 entry to be made. The entry initiating circuit is from the brush 150 and 3 emitter spot through the 3 line 155, the now-closed right side of contacts S4, a line 170, the now-closed left side of contacts a2 and b1 to the plug socket 164. The circuit will be completed in the manner explained before through the advance magnet AM of the singles order related to the card column bearing the 0 perforation. As a result, complement singles component 3 will be entered in this singles order.

When relays S are operative and a 3 perforation is sensed to render relay c operative, a 3 singles component also will be entered in the singles accumulator. The entry circuit in this event starts as in the previous example, but is routed from line 170 through the now-closed left side of contacts c4 and the normally closed sides of contacts d4, a1, and b1 to the plug socket 164.

When relays S are in control and a 6 perforation is sensed to render relay d effective, a 3 singles entry also will be made. The circuit for this entry differs from the preceding example only in being routed through the left side of contacts d4 and the normally closed side of contacts c4.

With relays S operative and relay a operated as a result of the sensing of either a 1, 4 or 7 perforation, a 2 singles complement component entry will be made. The circuit in such case extends from the brush 150 and 2 emitter spot through the 2 line 163, the now-closed right side of one of the contacts S2, the now-closed left side of the connected contacts a1 and the normally closed side of contacts b1 to the plug socket 164.

With relays S operative and relay b effective as a result of the sensing of a 2, 5, or 8 perforation, a 1 singles complement entry will be made. The circuit in such case proceeds from the brush 150 and emitter spot 1 through the 1 entry transmitting line 168 and via the right, now-closed side of contacts S1, the normally closed side of contacts a2 and the left, now-closed side of contacts b1, to the plug socket 164.

The operation of relay d, as a result of the sensing of a perforation 6, 7, or 8, along with operation of relays S prevents making of a multiples entry. In this case, the left side of contacts d1 will be closed and connected to the normally closed side of contacts c2 which, in turn, is in series with the normally closed side of contacts S3. As the normally closed side of contacts S3 are now open, the circuit path is broken at this point and a multiple component entry will not be made.

The operation of relays S, along with operation of relays c and d as a result of sensing of a 9 perforation, prevents the entry of a multiples component. In this case, the left side of contacts S4 will be open to break the entry path to the now-closed left sides of contacts c2 and d1.

When relays S are in operated condition and neither relay c nor relay d has been operated, as is the case when a 0, 1, or 2 perforation is sensed, multiple complement component 2 will be entered. The entry circuit for this condition extends from brush 150 and emitter spot 2 via the 2 line 163 and the right, now-closed side of contacts S3 through the normally closed sides of contacts c1 and d1 to the plug socket 156 from which the circuit is completed to a magnet AM of the multiples accumulator in the same way as explained for the entry of multiple 3 of additive value 9.

In the above manner, operation of relays S conjointly with operation of the coding relays causes entry of multiples and singles components corresponding to the "nines" complement of the sensed value representation.

*Carry operations.*—While a register order is in 9 value position, carry contact 98 is engaged with carry contact 9T. When the register order moves to or beyond 0 position, contact 98 is latched in engagement with carry contact 10T. Once each long cycle, cam contacts C7 close and establish the circuit of magnet CRB (Fig. 11a) via normally closed reset relay contacts Rb. Within the closure period of cam contacts C7, cam contacts C12 close and complete carry circuits prepared by engagement of contacts 98 with contacts 10T and 9T. Assuming, for example, that carry contacts 98 and 10T of the units order of the multiples accumulator and carry contacts 98 and 9T of the tens multiples order are engaged, a carry circuit will be established as follows (Fig. 11b): From line 129, via cam contacts C12, the common carry circuit line 172, the contact 10T of the multiples units order, the engaged central contact 98, the right, now-closed side of contacts CRBa of the tens multiples order and through the advance magnet AM of the multiple tens order, to line 130. A branch circuit will extend from the right side of tens order contacts CRBa via the engaged carry contacts 9T and 98 of the tens order and the right side of contacts CRBa of the hundreds multiples order through the advance magnet AM of this hundreds order. One long cycle point after an advance magnet has been energized by the carry circuit, cam contacts C13 close and complete branch circuits through the stop magnets of all the accumulator orders. As a result, one is carried from each order which has contacts 98 and 10T interengaged to the next order in the carry series. Also one is carried further to the order following said next order if the latter order has its carry contacts 9T and 98 interengaged. Thus, the advance of an order from 9 to or past 0 during variable entry operation causes a so-called short carry of unity to the next order to take place during carry time, and if this next order is in 9 position at the carry time, a so-called long carry of one takes place to the order following said next order in the carry series. Shortly after carry has been initiated, pins 106 on accumulator drive gears 43 (see Fig. 3) trip carry latches 104 to permit carry contacts 98 to return to central positions in which they are disengaged from carry contacts 9T and 10T.

The carry control contacts C7, C12 and C13 and latch-tripping pins 106 operate only once each long cycle; hence, only during alternate component value entry cycles (see Fig. 9a). If a register order advances to or past 0 during a component value entry cycle in which carry contacts C7, C12, C13 and pins 106 operate, the carry from this order to the next order in the carry series will take place during such entry cycle and the latch 104 will be tripped during this same entry cycle. If an order advances to or past 0 during an entry cycle preceding the operation of contacts C7, C12, C13 and pins 106, the carry contact 98 will remain latched in "10" carry position during the component value entry period of the next entry cycle. The carry from this order will then occur during such next entry cycle and the contact 98 thereof restored to normal position. There will be no loss of a carry entry resulting from the fact that carry enabling contacts C7, C12, and C13 close only during alternate component value entry cycles. This is because the maximum component entry which may be made during any component value entry circuit is a 3 entry. Therefore, no register order, regardless of its initial value position can possibly advance to or past 0 position more than once in three component value entry cycles. Accordingly, it is sufficient to allow for carry only once every two such entry cycles. As shown here, the accumulators each have five orders; units, tens, hundreds (HDS.), thousands (THDS.), and ten thousands (10THDS.).

Reference to Fig. 11b shows that carry contact 98 of the left hand order of the multiples accumulator is wired to a plug socket 174 which is connected by a plug wire 175 to a plug socket 176 leading through the right side of the contacts CRBa of the units order to the units order magnet AM. Similarly, the carry contact 98 of left hand order of the singles accumulator is connected through a plug wire 177 and the right side of units order contacts CRBa of the singles accumulator to magnet AM of this singles order. Thus, the units order of each accumulator follows the left hand order of the same accumulator in the carry series. To explain the purpose of this carry from left hand to right hand order of an accumulator, let it be assumed that an accumulator is receiving cardinal value entries of 1 to 9. Assume, further, that values of opposite sign are being entered, with values of one sign being entered as natural values and values of the opposite sign being entered as "nines" complements in each order, including the units order. It is known that subtraction by addition of complements gives a correct balance only when the tens complement is used. When a nines complement and a positive number are added, the balance is less by one than the correct balance. For example, in a five order accumulator:

Enter +432 _____ 00432
Enter —430 as nines complement_____ 99569

Total_____ 1:00001

Disregarding the surplus left hand 1, the accumulator shows a total which is 1 less than the correct difference of 2 between 432 and 430. By utilizing the passage of the left hand order through its carry point to cause the carry of 1 to the units order, the correct balance of 2 is produced.

Second example:

Enter +432 _____ 00432
Enter —435 as nines complement_____ 99564

Total_____ 99996

The presence of a 9 in the left hand order denotes a complementary or negative balance. The total is less by 1 than the tens complementary balance of 99997. However, by using nines complements as the conversion digits of the complementary balance obtaining by adding a nines complement to a positive number, the conversion of 99996 to the true negative balance gives 3 as the true negative balance.

However, if an additional nines complement is added to a nines complement balance, the total is less by 2 than the addition of two tens complement values. Thus, for each successive additional nines complement value added to a complement balance, the final result is less by the number of such additional nines complement entries than the nines complement balance which may be converted by use of nines complement digits to the true negative value.

Third example:

Enter —3 as nines complement_____ 99996
Enter —12 as nines complement_____ 99987
Enter —160 as nines complement_____ 99839

Total_____ 2:99822

Using nines complementary digits as conversion digits, the balance 99822 is converted to 177 as the true negative value. The correct true negative balance is 175, the nines complement of which is 99824. Thus, the complement balance obtained without compensating carries; i. e., 99822, is less by 2, the number of additional nines complement values added to the nines complement reading in the accumulator, than the correct nines complement of 99824. By carrying the 2 from the left hand order to the units order, the correct nines complement balance is obtained.

As indicated above, whenever addition of a positive number and a nines complement gives a positive balance, a compensating carry entry of 1 in the units order is required. Whenever a nines complement is added to a nines complement, a compensating carry entry of 1 in the units order should be made to provide the correct nines complement balance to be converted to a true negative balance by use of nines complement conversion digits. The capacity of the accumulator is so chosen, that the left hand order will never receive direct entry of a natural value and, further, that the natural or true balance of the values of opposite sign will not exceed the capacity of the orders of the accumulator below the left hand order. The left hand order will receive a 9 entry whenever a complement value is entered in the accumulator. Under such conditions, the left hand order will be in 9 value position if the balance of complement and natural entries is a complement balance and will be in 0 value position if the balance of entries is a natural balance. As an example, assume that negative amounts are to be entered as "nine" complements and positive amounts as natural values in a five order accumulator. Assume, further, that negative values 436 and 127 are to be entered in successive entry cycles. The complement of 436 is 99563 and of 127 is 99872. The entries of these complements causes the accumulator to register the complement sum 99,435. The corresponding natural value is 564 which is one higher than the sum of values 436 and 127. By providing for carry from the left hand to the units order, the complement sum will be 99,436, the corresponding natural value of which is 563; i. e., the true sum of values 436 and 127. As another example, assume that the complement of number 436 and the natural number 500 are successively entered. The entry of complement 99,563 of 436 plus entry of natural value 500 causes the accumulator to register 00063 which is one less than the correct balance of 500 minus 436. By providing for carry from left hand to units order, the registration will be 00064 which is the correct balance.

This principle of using the left hand order to differentiate between complement and natural totals and of carrying from left hand to right hand order applies to the instant case in which component entries instead of cardinal value entries are made. The left hand column of the amount field of each Hollerith card is punched with a 0 designation, as are, also, the amount columns to the left of the first significant digit designation. When the amount on the card is to be added, the sensing of 0 designations does not result in entry of components in the corresponding orders of the accumulators. When the amount in the card is to be subtracted the sensing of a 0 designation in a card column causes entry of a 2 component in the corresponding multiples order and a 3 component in the singles order. During fusion operations which will be described later, the multiples registration is multiplied by the common factor 3 and the product transmitted to the singles accumulator. Thus, if the left hand order of the multiples accumulator is at 2 and the left hand order of the singles accumulator at 3, the fusion operation will transmit product 6 to the singles order which will then read 9 just as though the cardinal value 9 had been entered therein directly. However, during component entry operations, the carry from one order to the next in the carry series occurs when the first order passes from 9 to or beyond 0. Thus, if five successive complements are entered, the left hand multiples order will receive five entries of 2 and the left hand singles order will receive five entries of 3. The carry from left hand multiples order to right hand multiples order will enter 1 in the latter order. The carry from left hand singles order to right hand singles order will enter 1 in the latter order. During fusion operation, the 1 carry entry in the multiples units order will be multiplied by 3 and transmitted to the units singles order. Thus, as a result of these operations, the singles units order will have received carries totaling 4. This is the same number of carries which would have been received by the units singles order if the cardinal digits of the five successive complementary amounts had been entered directly into the singles order. As another example, assume that the amount 436 on the card is to be subtractively entered and amount 437 on the next card to be additively entered. The subtractive amount 436 is entered in the multiples accumulator as 22110 and in the singles accumulator as 33233. The additive amount 437 is entered in the multiples accumulator as 00112 and in the singles accumulator as 00101. The addition of multiples entries is 22222 and of the singles entries is 33334. During fusion operation, the multiples sum 22222 is multiplied by 3 and transmitted as 66666 to the singles accumulator. The sum of the entries in the singles accumulator is then 00000 before carry from the left hand singles order to the units singles order occurs. Such carry will be effected and the final result will be 1 which is the correct balance of negative amount 436 and positive amount 437. In this case, the correcting or compensating carry takes place in the fusion cycle. Assume as still another example, that three successive cards bear subtractive amounts so that the left hand orders of the multiples and singles accumulator respectively will register 6 and 9 after component entry operations. During fusion operation, the multiple reading 6 will be multiplied by 3 and, in a manner explained subsequently, the left hand digit 1 of product 18 is entered in the units order of the singles accumulator and right hand digit 8 in the left hand order of the singles accumulator. The addition of 8 to the previous reading 9 in the latter order causes carry of unity to the units order of the singles accumulator. Thus, a total carry compensation of 2 is effected during fusion operation. To understand why the left hand digit of the product is entered in the units singles order, assume the highest singles order were capable of receiving entry of 10 or of 20. The entry of 10 would be manifested by a complete revolution of the highest singles order wheel and entry of 20 would be manifested by two such revolutions. As a result of each revolution of the highest singles order wheel, a compensating carry entry of 1 should be made to the units order. Thus, entry of 10 in the highest singles order is equivalent to a compensating entry of 1 in the units singles order and entry of 20 in the highest singles order would be equivalent to compensating entry of 2 in the units singles order. Since the left hand digits 1 and 2 of products obtained by multiplying the digits in the highest multiples order by the common factor 3 are equivalent to 10 and 20, respectively, should these values be transferred directly to the highest singles order, the latter, if capable of so doing, would make one revolution for entry of 10 and two revolutions for entry of 20. Such operations of the highest singles order would result in compensating entries of 1 and 2 in the units singles order. This desired effect is obtained according to the present invention by directly entering into the units singles order the left hand digit of the product obtained by multiplying the digit in the highest multiples order by the common factor. The entry of the product of the multiples total by factor 3 into the singles accumulator will also cause carries to take place within the latter accumulator and bring the left hand order to value position 9. The invariable result, at the end of fusion operations, of the synthesis of the multiples and singles totals derived from amounts the balance of which is negative is that the left hand order of the singles accumulator will register 9 and that all compensating carries will have taken place. The fused complement registration in the singles accumulator will be the same as though the cardinal digits of the cardinal amounts had been entered directly in the singles accumulator. For example, assume that negative amount 436, positive amount 437, negative amount 387, positive amount 264 and negative amount 136 are sensed on five successive cards. The component entries in the multiples and singles accumulator and their separate sums are indicated below:

| Multiples accumulator | Singles accumulator |
|---|---|
| 22110 | 33233 |
| 00112 | 00101 |
| 22100 | 33312 |
| 00021 | 00201 |
| 22210 | 33233 |
| 66553 | 100080 |

In the singles accumulator, a carry of unity will take place from the left hand to the right hand order during component entry operations. Thus, the singles accumulator, at the end of component entry operations will register 00081. During fusion operation, each digit of the multiples total 66553 will be multiplied by common factor 3. The left hand digit of the product 18 of the reading 6 in the left hand multiples order will be transmitted to the units order of the singles accumulator. The left hand digits of the other products will be entered in singles orders bearing a tens order relation to the transmitting multiples orders. The right hand digits of the products will be transmitted from the multiples orders to the corresponding singles orders. This may be indicated as follows:

```
Singles registration_____ 00081
Product of units multiples order_____     9
Product of tens multiples order_____    15
Product of hundreds multiples order_____    15
Product of thousands multiples order _____    18
Product of left hand multiples order_____  8 1
                                           ------
      Total after carries_____ 99741
```

The presence of 9 in the left hand singles order indicates that the total is a complement. The "nines" complement of this total is 258 which is the true negative balance of negative amount 436, positive amount 437, negative amount 387, positive amount 264, and negative amount 136.

In the above manner, by compensating carries taking place between left and right hand orders of the multiples accumulator during component entry and between the left and right hand orders of the singles accumulator during both component entry and fusion operations and by transmitting the left hand digit of the product of the common factor by the value registered in the left hand multiples order to the units singles order during fusion operation, the correct complement or natural cardinal balance is formed in the singles accumulator.

The fusion operations will now be explained in detail.

Fusion operations

The purpose of the fusion operations is to convert the separate component value balances into a single cardinal value balance. During fusion operations, the component value balance in the multiples accumulator will be multiplied by the common factor and the product transmitted to the singles accumulator. The singles accumulator will then register the cardinal value balance, complementary or natural, as indicated previously. The fusion operations occupy two long cycles, starting at the 14th point of one long cycle and ending at the 14th point of the second following long cycle (see Figs. 9a and 9b). These two long cycles may be referred to collectively as the fusion cycle. The initial step of the fusion cycle is the energization of fusion relay coil FN1 (Fig. 11a). To make clear the conditions for starting the fusion cycle, the circuit of coil FN1 is traced below:

*Coil FN1 circuit.*—The left line 129, cam contacts C4, cam contacts F11, either through fusion key contacts FK or relay contacts CLf, and via feed clutch armature contacts 17a and relay contacts Lb, through coil FN1, to opposite line 130.

Contacts C4 close between the 14th and 15th point of a long cycle. Cam contacts F11 have one closure period between "7½" of one long cycle and 8½ of the same long cycle and another closure period between "15½" of a long cycle and "0½" of the next such cycle. As long as cards are feeding, the cam contacts F11 will be open between "14" and "15" of a long cycle at which time the cam contacts C4 are closed. When the card feed is interrupted at the end of a sensing cycle, which may occur either at "8" or "0" of a long cycle, the cam contacts F11 will be closed. If the card feed is interrupted at "8," the cam contacts F11 will remain closed and the subsequent closure of cam contacts C4 during the same long cycle may complete the coil FN1 circuit. If the card feed is interrupted at the end of a long cycle, cam contacts F11 which closed at "15½" of the last long cycle will remain closed and when cam contacts C4 close at "14" of the next long cycle, the circuit of coil FN1 may be made. Thus, the fusion operations definitely cannot start before card feed and sensing operations are stopped. Another safety factor is provided by contacts 17a. These contacts will not reclose until clutch magnet FM is deenergized, which occurs either at "6" or "14" of a long cycle upon the breaking of cam contacts C1. Contacts Lb in the Coil FN1 circuit are closed by coil L (Fig. 11a). This coil was energized through cam contacts F7 and card lever relay contacts CLb. Coil CL was energized at the beginning of the third feed cycle (the first effective sensing cycle) upon closure of cam contacts F3 after card lever contacts LCL were closed. When coil CL was thus energized, it closed contacts CLb to cause coil L to be energized. Coil L then closed contacts La to provide a stick circuit through contacts RH11. Coil L thereupon maintains contacts Lb of the coil FN1 circuit closed. The insertion of contacts Lb in the fusion coil circuit prevents initiation of a fusion cycle unless card sensing cycles have previously occurred, since such sensing cycles are required to place coils CI and L in operation.

The fusion cycle may be manually initiated by closing fusion key contacts FK. This may be desired if the card feed has been interrupted, before the last card has been sensed, by depression of the stop key to open contacts 134 (Fig. 11a). Ordinarily, the fusion cycle will be automatically initiated after sensing of the last card and entry therefrom into the accumulators have taken place. When the last card of a group is passing the sensing brushes 38 during an entry cycle, card lever contacts LCL open, breaking the circuit of coil CLF (Fig. 11a); contacts CLFa open to break the first shunt circuit of card feed clutch magnet FM. Then cam contacts C1 open to break the other shunt circuit of the clutch magnet. Accordingly, the card feed will be interrupted at the end of the sensing cycle in which the last card is sensed for values. Meanwhile, the coding relays a, b, c, and d have been selectively operated according to the sensed designations and will remain in effect until after the variable, component entry initiating period of the entry cycle. The short cycle emitter (Fig. 11c) remains connected to the left side of the line to control transmission of entries selected by the coding relays until contacts EMb open. Coil EM remains energized and contacts EMb remain closed until cam contacts C3 open (see Figs. 9a and 11a) after the stop magnet circuits have been established through the 0 spot of the short cycle emitter. Hence, entries of component values derived from the last card will be entered during the related entry cycle. When cam contacts F4 opened near the end of the last-card sensing cycle, coil CL was deenergized (Fig. 11a). Thus, at the end of the last card sensing cycle, contacts 17a are closed as a result of the armature 17 of feed clutch magnet FM being in unattracted position while contacts CLf are closed due to deenergization of the coil CL. Thus, the circuit of fusion relay coil FN1 is prepared for completion upon the next closure of cam contacts C4.

If the card group contains an odd number of cards, the last card will pass through the sensing means 38—24 (Fig. 1) between points "0" to "8" of a long cycle. Card feed will stop at "8" of a long cycle, and the contacts 17a, CLf, and F11 will be closed. The next closure of cam contacts C4 will be at "14" of the machine cycle and will close the circuit of fusion coil FN1 at that point. Meanwhile, the entry cycle related to the last odd number card will be completed, and during such entry cycle any carries prepared by component entries will take place.

If the card group contains an even number of cards, the last card will be sensed by brushes 38 between long cycle point "8" and the end of the long cycle. The card feed will stop at the end of the long cycle. Cam contacts F11 will not close until about "15½" of the long cycle; i. e., after cam contacts C4 have reopened. The next closure of cam contacts C4 occurs at "14" of the next long cycle. Meanwhile, the entry cycle related to the last even number card is completed and an extra entry cycle follows and is completed before the fusion operations occur. During this extra entry cycle, any potential carries prepared by previous component entries may be effected.

The energization of fusion coil FN1 initiates two long cycles of fusion, collectively constituting a fusion cycle (see Figs. 9a and 9b). During the first such long cycle, the left hand digits of the products of the values in the multiples orders by the common factor will be read out by multiplying means and transmitted to the singles accumulator. The left hand digit of the product of the common factor by the left hand multiples order will be transmitted to the right hand or units order of the singles accumulator to provide for the carry compensation previously discussed. The left hand digits of the products formed by the common factor and the values in the other multiples orders will be transmitted to the singles accumulator orders of one denominational order higher than the multiples orders. For instance, the left hand digit of the product of which a value in the units multiple order is a factor will be transmitted to the tens singles orders.

During the second long cycle of fusion operations, the right hand digits of the products of the common factor by the values in the multiples orders will be transmitted to the corresponding orders of the singles accumulator. For example, the tens order of the singles accumulator will receive the right hand digit of the product of which the value in the tens multiple order is a factor.

Thus, during the fusion cycle, embracing two long cycles, the value in the multiples accumulator will be multiplied by the common factor and the product transferred to the singles accumulator. The singles accumulator will then register the total of the amounts derived from the card, with such total being manifested as cardinal values in the decimal system. If the balance is negative or complementary, the highest order of the singles accumulator will register 9, while if the balance is positive or natural, the highest singles order will register 0.

The transmission of the products of the multiples reading by the common factor will now be specifically explained. Referring to Fig. 11a, energization of fusion coil FN1 closes stick contacts FN1a to provide a holding circuit through cam contacts C6. At the beginning of the first long cycle of fusion operations, cam contacts C10 close and complete a parallel circuit from the left side of the line through contacts C6, FN1a, the normally closed side of contacts FN2b, contacts C10, and through double coil magnet LH to ground.

Magnet LH closes a group of contacts LHa (Fig. 11b) to connect the plug sockets 180 associated with the multiples accumulator orders, except the highest order, to plug sockets 182 of the next higher orders of the singles accumulator. The highest order plug socket 180 is connected by a pair of contacts LHa to a socket 182Z which is connected, in turn, by a plug wire 183 to a units order plug socket 182. Each order of plug socket 180 is connected by a plug wire 184 to the corresponding order plug socket 185 of the multiples accumulator. The plug socket 185 of each multiples order is wired to the common segment 115C of the readout commutator (see also Fig. 3) of the same order.

Magnet LH also closes contacts LH4 to 10 (Fig. 11b). Contacts LH10 connect the 0 segment of the long cycle emitter LE to a line 187 which leads to the common line 160 (Fig. 11c) of the stop magnets. Contacts LH4 to 6 connect the 1 segment of the long cycle emitter to the value segments 4, 5, and 6 of each readout commutator of the multiples accumulator orders. Contacts LH—7, 8, and 9 connect the 2 segment of the long cycle emitter to the value segments 7, 8, and 9 of these multiples readout commutators. The brush 132 of the long cycle emitter engages emitter segments 9 to 0 and 11 in succession at the times indicated in Figs. 9a and 9b. If any readout order of the multiples accumulator is registering the digit 7, 8, or 9, when the emitter brush 132 engages the 2 segment, a circuit will be completed to energize the magnet AM of the singles order connected to the multiples readout order through contacts LHa at the 2 entry time. For example, assume that the highest order of the multiples accumulator is in value position 8, so that its readout commutator has one brush engaging the common segment 115C and the opposite brush engaging the value segment 115—8 (see also Fig. 3). A circuit will then be completed at the 2 entry time as follows: The left side of the line, brush 132 of the long cycle emitter, the 2 segment thereof, through the contacts LH8, the common readout line 189—8, the 8 segment of the readout commutator of the highest multiples order and the brushes thereof to the common segment 115C thereof; thence, through connected socket 185 and a plug wire 184 to the left hand socket 180 and via the now-closed pair of contacts LHa to the socket 182Z. From socket 182Z, the circuit is completed via plug wire 183 to the units order socket 182 of the singles accumulator and a plug wire 190 to the singles units order socket 166, the connected normally closed sides of contacts RTSa and CRBa and through units order magnet AM of the singles accumulator, to the right side of the line.

Energization of this magnet AM initiates entry into the units order of the singles accumulator. Two long cycle points later, the brush 132 of the long cycle emitter engages the emitter spot 0 and closes a circuit as follows: From the left side of the line, through the emitter brush and 0 spot, via the now-closed contacts LH10, line 187, line 160 (Fig. 11c) and through the stop magnets SM, to the right side of the line. Energization of the stop magnet SM of the units order of the singles accumulator two long cycle points after energization of its magnet AM causes the units order to stop after the value 2 has been entered therein. This value 2 is the left hand digit of the product of the common factor 3 by the value 8 registered in the highest order of the multiples accumulator. In the above manner, the left hand digit of this product has been transmitted and routed to the units order of the singles accumulator to provide the carry compensation discussed before.

Through similar circuits, the left hand digit 2 of the product of the common factor by either value 7, 8 or 9 in any other order of the multiples accumulator will be transmitted to the order of the singles accumulator offset one order to the left with respect to the transmitting order of the multiples accumulator. For example, if the units multiples order registers digit 9, the entry initiating circuit will extend from the 2 segment of the long cycle emitter via the contacts LH9 and the common line 189—9 to the segment 9 of the readout commutator of the units multiple order; thence, by way of the brushes of this readout commutator and its common segment to related plug socket 185. The circuit proceeds through a plug wire 184 to the socket 180 of the singles units order, then via a pair of contacts LHa to the socket 182 of the tens order of the singles accumulator and through a plug wire 190 to the tens order socket 166, from which the circuit is completed through contacts RTSa and CRBa and the magnet AM of the tens singles order to the right side of the line.

If an order of the multiples accumulator is in 4, 5, or 6 value positions, entry initiating circuits such as traced above will be completed when the brush 132 of the long cycle emitter engages the 1 segment of the emitter. Thus, the left hand digit 1 of the product of the common factor 3 by either value 4, 5, or 6 in the multiples orders will be transmitted to the singles accumulator.

When cam contacts C7 close after the product digit entry period of the first long cycle of fusion operations, carry control magnet CRB is (Fig. 11a) energized in the same way as during the component entry operation. Cam contacts C12 and C13 then close during successive long cycle points to cause prepared carries to take place in the same manner as described before in connection with component entry operation. Such carry will take place if any singles order has been advanced to or past 0 position by the left hand digit entry made therein during the first long cycle of fusion operations. The carry circuits are the same as described for entry operation.

Cam contacts C6 (Fig. 11a) open at the 9th point of the first long cycle of fusion operations, after left hand digit entries have been completed, and close again at the 11th point. This open interval of cam contacts C6 is bridged at this time by contacts LH11 to maintain FN1 energized. Cam contacts C10 open shortly after the 11th cycle point, causing deenergization of magnet LH. Contacts LH11 reopen but the contacts C6 have meanwhile reclosed to keep the coil FN1 energized. Cam contacts C5 close momentarily at the 12th point of the cycle and with contacts FN1b also closed, a circuit is established through fusion relay coil FN2. Coil FN2 closes stick contacts FN2a to provide a holding circuit through cam contacts C6. Coil FN2 also shifts its contacts FN2b to prevent reclosure of the circuit of magnet LH when cam contacts C10 make again. At the beginning of the second half of a fusion cycle, cam contacts C11 close and establish a circuit through magnet RH. This circuit extends through cam contacts C6, FN1a, the now-closed lower side of contacts FN2b, and cam contacts C11 and will remain closed until contacts C6 reopen after entry of right hand product digits during the second half of the fusion cycle. Upon energization of magnet RH, contacts RH11 open to deenergize coil L (Fig. 11a). Contacts Lb reopen and will prevent the pickup circuit of coil FN1 from closing again when cam contacts C4 close near the end of the second half of fusion operations.

Magnet RH closes the group of contacts RHa (Fig. 11b). These contacts connect the plug sockets 180 associated with orders of the multiples accumulator to the sockets 182 of the same orders of the singles accumulator. Magnet RH also closes contacts RH1 to 10. Contacts RH10 connect the 0 spot of the long cycle emitter to line 187 which leads to the common line 160 of the stop magnets SM. Contacts RH1 to 9 connect the emitter spots of the long cycle emitter to the segments 1 to 9 of the readout commutators of the multiples accumulator in accordance with the right hand digits of the products of the common factor by values 1 to 9. For example, the contacts RH9 are connected to the 7 spot of the long cycle emitter to provide for the transmission of the right hand digit 7 of the product of factor 3 by value 9 when the brush 132 reaches the 7 spot of the emitter. A right hand digit entry circuit will be traced, assuming the highest order of the multiples accumulator to be registering value 2: From the left side of the line through the brush 132 of the long cycle emitter LE, the 6 spot thereof, contacts RH2, the common line 189—2, the 2 segment of the highest order multiples readout commutator, and the brushes and common segment thereof to connected plug socket 185, thence through a plug wire 184 to the left hand plug socket 180 and by way of a pair of contacts RHa to the plug socket 182 connected by a plug wire 190 to the socket 166 of the highest order of the singles accumulator. The circuit is completed therefrom through the previously traced path to the magnet AM of the highest singles order. This circuit energizes magnet AM six long cycle points before the brush 132 of the long cycle emitter reaches emitter spot 0 to close the stop magnet circuit through contacts RH10. Accordingly, the right hand digit 6 of the product of factor 3 by the value 2 in the highest multiples order will be transmitted and routed to the highest order of the singles accumulator. Through similar circuits, the right hand digits of the products of which the values in the other multiples orders are factors will be transmitted to the corresponding orders of the singles accumulator.

Under successive control of cam contacts C7, C12, and C13, carry operations will take place in the singles accumulator, in the now familiar manner, wherever a carry condition has been set up by the entry of the right hand digits.

Cam contacts C6 open at the 9th point of the second cycle of fusion operations to deenergize magnets FN1, FN2, and RH.

At this point, the singles accumulator is registering the fused, cardinal value total obtained by combining the product of the multiples component total and common factor with the singles component total.

The fused total may be recorded by printing or punching or both in a manner familiar to the art. Figs. 11a, b, and c indicate controlling circuits for total recording. During fusion operations, when magnet RH was energized, contacts RH11 opened, deenergizing coil L (Fig. 11a). Contacts Lc in series with the total key contacts TK thereupon reclosed. After fusion operations, the operator depresses the total key to close contacts TK. When cam contacts C9 next close, a circuit is established from the left side of the line (Fig. 11a), through contacts C9, Lc and TK to a terminal 195. From this terminal, branch circuits are completed through magnet TRM, relay coil TR, recording clutch magnet TM and via plug wires 196, through parallel magnets TRS. It should be noted that this circuit cannot close unless relay contacts Lc are closed. Contacts Lc are held open by coil L during card feed and card entry cycles and until the coil is deenergized by opening of contacts RH11 during the second half of the fusion cycle. Contacts RH11 open and coil L is deenergized and its contacts Lc reclose while cam contacts C9 are open. The next closure of contacts C9 occurs after the fusion operations have been completed. Thus, the recording cycle cannot begin until after completion of fusion operations following card entries. Coil TR closes stick contacts TRa to provide holding circuits for the relay coil and magnets through normally closed recording cycle contacts TP2.

Magnet TM attracts its armature 197 (see Fig. 11c) to release clutch dog 198. At the beginning of the recording cycle (see Fig. 9b) the dog 198 engages clutch collar 199 to couple the recording cycle shaft 46 to the driving shaft 45 (also see Fig. 1) for the duration of the long cycle. During the recording cycle, the brush 200 of the emitter RE on shaft 46 engages the emitter spots 9 to 1 in synchronism with the rise of the carrier 201 controlled by cam 202 on shaft 46. Carrier 201 carries recording elements 203 (which may be printing or punching elements) for recording digital values 9 to 1. The 9 to 1 elements 203 pass a recording position in synchronism with the engagement of the spots 9 to 1 of the emitter RE by the emitter brush. Magnets TRS closed contacts TRSa (Fig. 11c) between the selecting magnets RM and plug sockets 204. From each of these plug sockets, a plug wire 205 is extended to plug sockets 206 wired to the common segments of the readout commutators of the singles accumulator orders (Fig. 11b). Magnet TRM closed contacts TRM1 to 9 connecting the segments 1 to 9 of the recording cycle emitter RE to the 1 to 9 lines 189 which are connected to the segments 1 to 9 of the readout commutators. Accordingly, as the brush of emitter RE successively wipes emitter spots 9 to 1, circuits are closed at differential times through the recording magnets RM. For instance, if the lowest singles order registers value 3, then the following circuit is closed: The left side of the line (Fig. 11b), the brush and spot 3 of the emitter RE, contacts TRM3, the 3 line 189, the 3 segment of the singles units order commutator, the brushes and the common segment thereof, the plug socket 206, the plug wire 205 to the lowest order socket 204, the connected contacts TRSa, and through the units order magnet RM, to ground. Energization of the magnet RM releases a latch 207 for engaging a tooth 208 of carrier 201 to stop it with the 3 digit recording element 203 in recording position. Recording operations and restoration of the latches 207 may be effected in a well-known manner, as disclosed for example, in Patent No. 1,976,617. Near the end of the recording cycle, contacts TP2 open, causing deenergization of the magnets TRM, TR, TM, and TRS.

The fused total may have been a complement or a natural number and total recording may be effected of either of such totals. If desired, the complement may be read out as its natural equivalent by means such as disclosed in Patent No. 2,340,772.

After total recording has been completed, the operator may depress the reset key (Fig. 11a) to close reset key contacts 131. As described previously, the closure of cam contacts C4, with contacts 131 and F11 closed, completes branch circuits through magnet REM and relay coil R. Coil R closes its contacts Ra to provide a holding circuit through contacts C8. Parallel branch circuits are also completed through magnets RTM and RTS. Magnet RTS shifts contacts RTSa (Fig. 11b) of the singles accumulator to close the right sides and open the left sides of these contacts. Magnet RTM similarly shifts contacts TRMa of the multiples accumulator. Magnet REM closes contacts REM1 to 11 (Fig. 11b). Contacts REM1 to 9 connect the complementary spots 9 to 1 of the long cycle emitter LE to the 1 to 9 lines 189 which are wired to the 1 to 9 segments of all the readout commutators. Contacts REM10 connect the 0 spot of emitter LE to the common stop magnet line 187. Contacts REM11 connect the 11 spot of the emitter to the start relay coil SK, as explained previously. During the cycle of emitter LE, entry will now be made into each accumulator order of the "tens" complement of the digit registered therein, with the result that the accumulator order will be brought to 0 position.

For instance, if the lowest order of the singles accumulator is in the 2 position, then as the brush of emitter LE engages 8, the following zeroizing circuit is completed: From the left side of the line (Fig. 11b), the brush and spot 8 of emitter LE, the contacts REM2, the 2 line 189, the 2 segment of the readout commutator of the lowest order, the brushes and common segment thereof, a line 210, the now-closed right side of the connected contacts RTSa, the normally closed side of contacts CRBa, and through advance magnet AM of the highest multiples order, to ground.

Eight long cycle points later, the brush of emitter LE engages the emitter spot 0 and causes parallel circuits to be completed through the spot magnets SM. Such stop magnet circuits extend through contacts REM10 to line 187, line 160 (Fig. 11c) and the stop magnets, to ground. Thus, the highest multiples order has been advanced eight value steps from position 2 to position 0. Similarly, all the other accumulator orders are zeroized.

During zeroizing operations, cam contacts C8 overlap the closure period of cam contacts C7 and coil R remains energized; hence, contacts Rb (Fig. 11a) will be open at the time contacts C7 close and magnet CRB will not be energized. Contacts CRBa thus remain in normal position and prevent carry operations from being effected during the reset cycle. Carry contacts latched in position during reset will be mechanically unlatched in the usual manner during the long cycle in which resetting takes place.

When the brush of emitter LE engages emitter spot 11, the pickup circuit of start relay coil SK is established, followed by the holding circuit through contacts SKa and fusion relay coil contacts FN1c. It is clear now that contacts FN1c are opened during fusion operations to break the holding circuit of start relay coil SK. With coil SK energized, the operator may start a new series of operations by depressing the start key (Fig. 11a).

If it is desired to perform progressive totaling operations, the magnet RTS for operating contacts RTSa of the singles accumulator will not be plugged into the reset key circuit. Its contacts RTSa will remain in normal condition and resetting of the singles accumulator during a reset cycle will not take place. The multiples accumulator will be reset while the cardinal total will remain registered in the singles accumulator. Further component entries will be made in the manner described, and after each fusion cycle, the singles accumulator will register the progressively accumulated total.

It may be noted that a reset cycle must take place before card feed may start, as coil SK must be energized before card feed may be initiated, and coil SK is energized during a reset cycle. Further, it may be noted that once card feed has begun, it must be interrupted before a fusion cycle may be initiated, this being insured by contacts F11, CLf, and 17a. Further, a recording cycle cannot be initiated after card feed operations have begun until a fusion cycle has first taken place and has caused coil L to be deenergized so as to permit contacts Lc to reclose. After card feed has been interrupted and a fusion cycle has occurred, card feed cannot be resumed until a reset cycle has occurred since the contacts FN1c opened during the fusion cycle to break the stick circuit of card feed initiating control coil SK. In this manner, the operations are forced to occur in the following sequence: Reset cycle, card feed cycles, fusion cycle, and recording cycle.

The use of common factor 4

Other suitable common factors besides 3 may be used. Fig. 12a is a table showing the relation of components derived from decimal values 0 to 9 on the basis of a common factor of 4. Fig. 11AA shows a portion of analyzing means used in this embodiment. Although combinational code relays may be used, as in the factor 3 embodiment, it is preferred in this instance to use singly operating coding relays Q. It will be understood, further, that singly operating coding relays may be used also for a factor 3 embodiment. In using singly operating coding relays, the plate P of each vacuum tube is connected to the common segment 145 of only one distributor D, as indicated in Fig. 11AA. For each column of the amount field, there are ten coding relays Q0 to 9, each with a pickup and a holding coil. The pickup coils Q0 to 9 are wired, respectively, to the segments 0 to 9 of the distributor D. When a sensing brush 38 senses one of perforations 0 to 9 in an amount column of the card, it is effective through the associated vacuum tube and distributor to cause energization of the corresponding pickup coil of relay Q. The pickup coil closes stick contacts Qa to cause the companion holding coil to be energized. The holding coils remain energized until after the component entry initiation period of the entry cycle for the sensed card. Thus, the sensing of perforation 0 places the Q0 relay in action, the sensing of perforation 1 renders the Q1 relay active, and so on. The circuit of the pickup coil of subtraction control relay SS is not shown in Fig. 11AA as it is the same as in the previous embodiment. As before, the relay SS will be energized and cause relays S (Fig. 11a) to become effective if the card under the brushes has a 9 hole in the classification column to indicate a subtractive amount.

Fig. 11cc indicates the connections of the segments 1, 2, and 3 of the short cycle emitter SE to contacts of coding relays Q and classification relays S for the component entry selecting circuits of one order of the multiples accumulator and of the corresponding order of the singles accumulator. Assume first that relays S are unoperated. If either relay Q1, Q5, or Q9 is effective, then upon the brush of the short cycle emitter engaging the 1 spot thereof, an entry circuit will extend through either contacts Q1s, Q5s, or Q9s of the singles section to energize the advance magnet AM of the singles accumulator at the 1 component entry time. The relay contacts Q5m also will be closed when relay Q5 has operated, and will route a 1 entry circuit to the magnet AM of the multiples accumulator. If relay Q4, Q6, or Q7 is active, either contacts Q4m, Q6m, or Q7m will route a 1 entry to the multiples accumulator magnet AM. The closure of relay contacts Q8m or Q9m, resulting from sensing of an 8 or 9 perforation, will route a 2 entry, transmitted from the 2 spot of the short cycle emitter, to the magnet AM of the multiples accumulator. A singles entry of 2 will be transmitted through either contacts Q2s or Q6s. A 3 singles entry will be transmitted by the short cycle emitter through its 3 spot and through either contacts Q3s or Q7s.

Assume that the amount on the card is a subtractive amount, so that relays S are operated. Then, the shifting of contacts S5 will route a 1 multiple entry through either contacts Q2m or Q3m. The Q4m and Q5m contacts are directly connected to the 1 entry transmitting line without intervening S relay contacts since the sensing of either additive or subtractive 4 or 5 will cause a 1 multiple entry to take place. The shifting of contacts S6 routes a 2 multiple entry through either contacts Q0m or Q1m. The shifting of contacts S7 routes a 1 singles entry through either Q0s, Q4s, or Q8s. The shifting of contacts S8 routes a 3 singles entry through either contacts Q2s or Q6s. The shifting of contacts S9 routes a 2 singles entry through either contacts Q3s or Q7s. When the short cycle emitter brush reaches the 0 spot, the stop magnets are energized, as in the previously described embodiment.

The multiplying connections closed by the LH and RH magnets during a fusion cycle will be so arranged for the embodiment using the factor 4 as to cause the registration in the component accumulator to be multiplied by 4 and transmitted to the singles accumulator. For instance, LH8 and 9 will connect the 8 and 9 segments of the multiples readout commutator to the 3 spot of the long cycle emitter, the RH8 and 3 contacts will connect the 8 and 3 readout segments to the 2 spot of the long cycle emitter, and so on.

The timing charts of Figs. 9a and 9b apply to the embodiment using factor 4 as well as to the embodiment using factor 3.

*The embodiment using component value records*

Fig. 14 shows a component value record, half the length of a Hollerith record, and having six index positions E to X in each column. The X perforation in an assigned column indicates that the amount field of the record bears a subtractive value. The positions E, D, and C are the singles or remainders index positions while positions B and A are the multiples index positions. In this embodiment, the common factor is 3 or a triple, and elements related to multiples of the triples may be characterized, briefly, ar triples elements or multiples elements. A perforation in position E designates singles value 3, in position D designates singles value 2, and in position C signifies singles value 1. The position B is perforated to designate multiple 2 and position A to indicate multiple 1. These several index positions may be perforated singly and in combination to represent the components derived from a cardinal series of values on the basis of any suitable common factor. It is preferred to use common factor 3, and Fig. 14 shows the component punching on this basis for the decimal values. Thus, decimal value 1 is represented by a perforation in singles index position C corresponding to singles or remainder component 1, decimal value 5 is represented by perforated positions A and D designating multiple 1 and singles 2 and so on.

The successive index positions E to A of a component value record pass an analyzing station in successive long cycle point intervals. The short cycle emitter SE (Fig. 15b) for this embodiment has six emitter spots here designated, for convenience, E, D, C, B, A, and 0. The first five are engaged by the emitter brush in synchronism with the travel of the index positions E to A of a card past analyzing station and spot 0 is engaged one long cycle point interval later.

The reset, start, fusion, and recording circuits are generally the same as in the previous, Hollerith card embodiments, while the sensing circuits differ in being supplied from the 40 volt line and in omitting the vacuum tubes and distributors. The timing of the elements of this embodiment is indicated in Fig. 13 which does not show the fusion, recording, and reset cycles, as these are similar to the corresponding cycles of the Hollerith card embodiments. The component value records travel in one-to-one synchronism with the movement of the long cycle means including the accumulator drive gears 43. Two such records pass an analyzing station during a long cycle interval and component values from such two cards are entered in the multiples and singles registers during an interval equal to a long cycle.

The closure of the main switch (Fig. 15a) places motor M in operation, and the motor thereupon continuously drives the mechanism connected thereto without intervening clutches. After placing a stack of component value records in the supply hopper, the operator depresses the reset key to close key contacts 131 (Fig. 15a), and when cam contacts C4 make, magnet REM and coil R are energized. Coil R closes stick contacts Ra to provide a holding circuit through cam contacts C8. Contacts REM1 to 9, 0, M0, and 11 (Fig. 15b) close. When the long cycle emitter reaches the 11 position, a circuit is formed, via contacts REM11, through start relay coil SK. Contacts SKa close to form a stick circuit which will hold until contacts FN1c open during a fusion cycle. Contacts SKb (Fig. 15a), in series with the start key contacts 133 close, and with the start key depressed, a circuit is completed upon the next closure of cam contacts C2 through the feed clutch magnet FM and relay coil FC. There is a mechanical lag between energization of clutch magnet FM and engagement of the feed clutch, and taking this lag into consideration, the energization of the feed clutch magnet causes the card feed to start either at the 4th or 12th point of a long cycle (see Fig. 13) depending on whether the start key was depressed during the first or second closure period of cam contacts C2. The first card is now fed out of the supply hopper, and by the end of the first card feed cycle (short cycle) is at the first sensing means 37—23 (Fig. 1), meanwhile closing card lever contacts UCL. The operator holds the start key down to cause a second feed cycle to take place during which the first card reaches the second analyzing means 38—24, meanwhile closing card lever contacts LCL. The closing of these contacts completes a circuit through a coil CLF (Fig. 15a), and contacts CLFa close. These contacts are in series with now-closed relay contacts FCa and stop key contacts SP and establish a shunt circuit through coil FC and feed clutch magnet FM. A second shunt circuit is established through cam contacts C1 and FCa. During the open period of contacts C1, the first shunt circuit maintains magnet FM and coil FC energized. When the cards are exhausted or the stop key depressed, the first shunt circuit breaks and the feed clutch magnet is deenergized upon the opening of cam contacts C1. The card feed will then stop at either the 4th or 12th long cycle point.

If the card, as it passes the first set of sensing brushes 37, has a perforation in the X position of the classification column, a circuit is completed from the left side of the line (Fig. 15a) through card lever contacts UCL, the contact roll 23, the brush 37 sensing the X hole, cam contacts F8, and through coil SS, to the other side of the line. Coil SS closes contacts SSa to establish a holding circuit timed by cam contacts F9 to endure during the next card feed cycle until the index positions E to A of the card have been sensed by the brushes 38. When cam contacts F10 and F11 close during the said next feed cycle, branch circuits are formed through magnets RS and MS. Magnet RS remains energized during the sensing by brushes 38 of the singles component positions E, D, and C, while magnet MS remains energized longer, until the component positions B and A also have been sensed by brushes 38.

By the end of the second card feed cycle, the leading edge of the front card is at the brushes 38, and card lever contacts LCL have been closed. Cam contacts F3 close at the beginning of the next card feed cycle during which the first card will pass under the brushes 38. The closure of contacts F3, with contacts LCL also closed, completes a pickup circuit through relay coil CL (Fig. 15a). Contacts CLa close and complete a stick circuit extending through cam contacts F4. Contacts CLd (top of Fig. 15b) close to prepare the second sensing means 38—24 to be effective to sense the designations on the first card during the third card feed cycle from the beginning. As long as cards are feeding, the contacts CLd will close each card feed cycle during the passage of the index positions E and A of each card through the second sensing means.

Coil CL, when picked up at the beginning of the third card feed cycle; i. e., the first effective sensing cycle, closes contacts CLe which in conjunction with cam contacts F6 pick up the coil EM. Contacts EMa close to provide a stick circuit through cam contacts C3. Contacts EMb connect the brush of the short cycle emitter SE (bottom of Fig. 15b) to the left side of the line. Coil CL also opens contacts CLf (Fig. 15a) to prevent automatic completion of the fusion coil circuits until cards are exhausted. Coil CL also closed contacts CLb which in conjunction with cam contacts F7 pick up coil L. Coil L closes its contacts La to provide a stick circuit through contacts RH11 (Fig. 15a). Coil L closes contacts Lb in the pickup circuit of fusion coil FN1.

One of the feed cycle cams 50 (Fig. 1) reciprocates a rod 235 (right center of Fig. 15b) connected through insulation to the central blades of switching contacts F2. The right sides F2a of these contacts tend to close and are permitted to do so by bar 235 during the sensing of the singles component index positions E, D, and C. After index position C has been sensed, the bar 235 shifts the central blades of contacts F2 to close the F2b sides and open the F2a sides. The F2b sides remain closed during the sensing of the multiples component index positions B and A, after which the bar 235 takes an intermediate position in which the contacts F2a and F2b both are open until the next sensing period of the singles index positions E, D, and C begins. Assume that the card passing under the sensing brushes 38 does not have an X hole in the classification column so that magnets RS and MS (Fig. 15a) will not be energized. Such card bears an amount to be additively entered. During the passage of index positions E, D, and C of the card through the second analyzing means, perforations representative of singles components are sensed by brushes 38, and entries of the singles components are routed through contacts F2a into the singles accumulator. During the passage of the index positions B and A, the perforations representing the multiples components are sensed and entries of the multiples are routed through contacts F2b into the multiples accumulator. Assume, for example, that a column of the amount field has a perforation in a singles index position E, D, or C. Upon the sensing of such perforation by a brush 38, the following circuit closes (Fig. 15b):

*Singles entry initiating circuit.*—From the left side of the line, through contacts F1, now-closed relay contacts CLd, contact roll 24, the column sensing brush 38, its plug socket 138, a plug wire 239, a socket 240, the now-closed right side F2a of a switch F2; thence through the normally closed side of subtraction relay contacts RSa, reset relay contacts RTSa and carry shift contacts CRSa, and through an advance magnet AM of the singles accumulator to the right side of the line.

Magnet AM initiates clutching of the related register wheel 78, in the manner described before, to the accumulator drive gearing. The gear 43 of the drive gearing advances the clutched-in register parts through one value step during an interval equal to a long cycle point.

The brush of short cycle emitter SE (Fig. 15b) is wiping the emitter spots successively in synchronism with the travel of the index positions of the card past the sensing means 38 and in synchronism with the actuation of the clutched-in register by a drive gear 43. Thus, the emitter brush engages the emitter spot B (Fig. 15b) three long cycle point intervals after the spot E was engaged, two such intervals after the spot D was engaged, and one such interval after the spot C was engaged. The engagement of the emitter spot B by the brush of the short cycle emitter closes the following circuit (Fig. 15b):

*Singles entry stop circuit.*—The left side of the line, now-closed contacts EMb, the brush and the spot B of the short cycle emitter, a wire 242, and in parallel, via the normally closed side of subtraction relay contacts RSb, through the stop magnets SM of the singles accumulator, to the other side of the line.

Magnets SM of the singles accumulator initiate unclutching of the singles register orders from the drive means. The energization of these magnets SM occurs three long cycle point intervals after a magnet AM of the singles accumulator was energized by the sensing of a perforation in the E position, two such intervals after energization of a magnet AM by the sensing of a D perforation, and one such interval after energization of a magnet AM by sensing of a C perforation. Thus, singles component 3, 2, or 1 will be entered in a singles order, depending on whether the associated card column has an E, D, or C perforation.

During the passage of multiples index positions B and A past sensing brushes 38, the right sides F2a of contacts F2 are open and the left sides F2b are closed. Upon the sensing of a perforation in one of positions B or A of a column, the following circuit is closed:

*Multiple entry initiating circuit.*—From the left side of the line, through contacts F1, CLd, common roll 24, the brush 38 sensing the perforation, the plug connection to the proper socket 240, the now closed left side F2b of the connected switch F2, a wire 244, and via the normally closed sides of subtraction relay contacts MSa, contacts RTMa, and CRMa through the advance magnet AM of the multiples accumulator order associated with the card column, and to the opposite side of the line.

Two long cycle points interval after the sensing of a B perforation and one long cycle point interval after the sensing of an A perforation, the short cycle emitter brush engages the 0 emitter spot and closes circuits through the stop magnets SM of the multiples accumulator. Such circuits extend by way of wires 245 and 246, and the normally closed sides of contacts MSb through the magnets SM of the multiples orders. Energization of these magnets initiates declutching of the multiples register orders. Thus, either a multiple entry of 1 or 2 will be made in a multiples order, depending on whether an A or B perforation was sensed in the related card column.

In the above manner, the component or components, derived by dividing the corresponding cardinal value by the common factor, will be entered in the accumulators. Thus, using the common factor 3, the cardinal value 7 is represented in a card column by a perforation in the B position and a perforation in the C position. The perforation in the B position designates multiple component value 2 and the perforation in the C position designates singles component value 1. The multiple component 2 and the singles component 1 will be entered through the circuits traced above in corresponding orders of the multiples and singles accumulators.

If a card has an X hole in the subtraction control column, then its passage through the first analyzing means results in subtraction control magnets RS and MS (Fig. 15a) being energized, as previously described. Contacts RSa and b and MSa and b are shifted by their respective magnets RS and MS. The shifting of contacts RSa disconnects the sensing circuits from the advance magnets AM of the singles orders and connects these magnets, instead, to a line 248, leading to the E emitter spot of the short cycle emitter. The shifting of contacts RSb disconnects the magnets SM of the singles orders from the line 242 leading to the B emitter spot and connects these stop magnets, instead, to the sensing circuits. The shifting of contacts MSa and b similarly switches the control of advance magnets AM of the multiples orders from the sensing brushes to the B emitter line 242 and the control of stop magnets SM of the multiples orders from the 0 emitter lines 245 and 246 into the sensing circuits brushes. When the short cycle emitter brush engages the emitter spot E during the feed cycle in which the card with the subtractive amount is passing the sensing brushes 38, the following circuit is completed:

*Singles complement entry circuit.*—The left side of the line, contacts EMb, the brush and spot E of the short cycle emitter, line 248 in parallel, via the now-closed right sides of the contacts RSa and through contacts RTSa and CRSa, through the magnets AM of the singles accumulator, to the right side of the line.

When the sensing brush of an amount column encounters an E, D, or C perforation, the following circuit is closed:

*Singles complement stop circuit.*—The left side of the line, contacts F1, CLd, roll 24, the active brush 38, the plug connections to the proper socket 240, the now-closed right side F2a of a switch F2, the now-closed left side of shifted contacts RSb, and through the stop magnet SM of the related singles order, the right side of the line.

The index positions of a card are traversing brushes 38 in step with the successive engagement of the short cycle emitter spots by the emitter brush. Hence, if a card column has an E perforation corresponding to remainder 3, the start and stop magnets of the related singles order will make at the same time. There will be no entry advance of the singles order since the singles complement of remainder 3 is zero. If the card column has a D perforation, corresponding to the singles 2, the stop magnet of the singles order will be energized one long cycle point after energization of the advance magnet and singles complement 1 will be entered. When the column has a C perforation, corresponding to singles 1, the advance magnet is energized two long cycle points before the stop magnet and singles complement 2 is entered. If a column has no perforation in the singles positions E, D, and C, the stop magnet will not be energized under control of the sensing brushes but will be energized under control of the B spot of the short cycle emitter just as in additive entry. This result is obtained by timing the cam contacts F10 to break as the B spot of the short cycle emitter is engaged by the emitter brush. When contacts F10 break, magnet RS is deenergized and contacts RSa and RSb return to normal. Therefore, as the short cycle emitter brush engages spot B, the stop magnets SM of the singles orders are energized by parallel circuits extending from B line 242 through the normally closed sides of contacts RSb. In this manner, if a card column is not perforated in a singles index position E, D, or C, the related singles order will be started and stopped under successive control of the spots E and B of the short cycle emitter, three long cycle points apart. Thus, the singles complement 3 of singles value 0 will be entered.

Magnet MS remains energized and its contacts stay in shifted condition during the travel of multiples positions B and A past the sensing brushes 38 and the synchronous travel of the short cycle emitter brush past emitter spots B and A. When the emitter brush engages spot B, parallel circuits branch off from the B line 242 through the now-closed right sides of shifted contacts MSa and via the contacts RTMa and CRMa through the advance magnets AM of the multiples accumulator. During this same multiples sensing period, the switches F2 have been shifted by the bar 235 to positions in which the sides F2b are closed and sides F2a open. Consequently, the sockets 240 plugged to the sensing brushes of the amount field are disconnected from the singles orders and connected to the multiples orders. Accordingly, when a perforation B or A is sensed in a column of the amount field, a multiple complement stop circuit will be established through the magnet SM of the related multiples order. This circuit will proceed from the socket 240, connected to the active brush 38 and by way of the now-closed left of a switch F2, a wire 244, and the now-closed right side of one of the contacts MSb, through the stop magnet SM of the related multiples order.

If the B index position of the column is perforated, the multiples complement entry stop and start circuits will be simultaneously formed and no multiple entry will be made. This is consistent with the fact that the multiples complement of multiple 2, represented by the the B perforation, is 0. If the A index position is perforated, the multiples entry circuit will be made one long cycle point before the stop circuit and multiple 1 will be entered; i. e., the multiples complement of represented multiple 1. As the short cycle emitter brush engages the 0 spot, cam contacts F11 break, deenergizing magnet MS, and contacts MSa and b return to normal. The return to normal of contacts MSb while the emitter brush is on spot 0 results in the energization of the stop magnets of the multiples orders. Accordingly, if a column is unperforated in the A and B positions, the related multiples accumulator order will be started and stopped under successive control of spots B and 0 of the short cycle emitter and will receive a 2 entry. This is the multiple complement of multiple value 0. Only significant values 1 to 9 are represented in the amount field by component value perforations. A blank column of the amount field signifies the 0 value. The left hand column of the amount field will be left blank so that if a card bears an additive value, there will be no entries therefrom in the left hand orders of the multiples and singles accumulators, while if the card bears a subtractive value, the left hand singles order will receive a 3 entry and the left hand multiples order will receive a 2 entry. The left hand orders of the accumulators are used for the same purpose as in the Hollerith card embodiments to differentiate between registrations of complementary and natural balances.

Carry operations for the singles accumulator will be initiated by each closure of cam contacts C7 during the portion of a long cycle in which the singles entries derived from a record are being completed. Referring to Fig. 15a, the closure of contacts C7 completes a circuit from the left side of the line through normally reset relay contacts Rb, contacts C7, and magnet CRS to line. Magnet CRS shifts the CRSa contacts (Fig. 15b) of the singles accumulator. Upon closure of cam contacts C12, carry entry circuits may be routed through magnets AM of the singles accumulator by the "10" and "9" carry contacts engaged by carry contacts 98 of the singles accumulator. The singles carry entry circuits make one long cycle point before the cam contacts C15 make. Circuits are thereupon completed from the left side of the line, via contacts C15, line 242, the left sides of contacts RSb and through the stop magnets SM of the singles accumulator. Thus, carry entries of 1 will be made in the singles accumulator wherever carry conditions have been set up during the two, singles component entry periods preceding each closure of cam contacts C7.

Carry operations for the multiples accumulator are initiated by closure of cam contacts C14 (Fig. 15a) to cause energization of magnet CRM. Contacts CRMa of the multiples accumulator are shifted and upon closure of cam contacts C13 (Fig. 15b), the carry entry circuits are routed by interengaged carry contacts of the multiples accumulator through advance magnets AM thereof. One long cycle point later, cam contacts C16 make, connecting the left side of the line to the line 246 from which parallel circuits are completed via the left sides of switches MSb through stop magnets SM of the multiples accumulator. Thus, carries prepared during the two multiples entry periods preceding closure of cam contacts C14 are effected in the multiples accumulator. For reasons given in the description of the Hollerith card embodiment, it is sufficient to provide for carry entries only once every long cycle interval. Also for the reasons previously given, the left hand order of each accumulator carries to the units order of the same accumulator during component entry operation.

The operations following component entry operations related to a group of component value records are substantially the same for this embodiment as for the Hollerith card embodiment. These operations will be briefly described in connection with the following example of six successive entries derived from a group of six cards such as shown in Fig. 14:

| Cardinal value | Multiples | Singles |
|---|---|---|
| 432 | 00100 | 00132 |
| −698 | 22100 | 33001 |
| −731 | 22022 | 33202 |
| −1201 | 22222 | 32132 |
| +800 | 00200 | 00200 |
| −6456 | 21111 | 30210 |
| Accumulation −7854 | 87755 | (1)28877 |
| Carry-10THDS. singles order to units singles order. | | 1 |
| Accumulation after carry | 87755 | 28878 |
| 1st half of fusion cycle | | 2211 |
| Compensating entry from highest multiples order to units singles order. | | 2 |
| Accumulation in singles register after 1st half of fusion cycle and carries. | | 50990 |
| 2d half of fusion cycle | | 41155 |
| Accumulation in singles register after carries. | | 92145 |
| Equivalent true amount obtained by nines complementary conversion. | | −7854 |

The fusion cycle will now be described briefly. When the group of cards is exhausted, the card lever contacts LCL open and relay CLF (Fig. 15a) is deenergized. Contacts CLFa reopen and break one of the shunt paths through the feed clutch magnet FM and relay FC. The feed clutch magnet and relay are held energized until cam contacts C1 break. The card feed means will stop at either the 4th or 12th point of a long cycle depending on whether the cards were exhausted during the first or second half of the long cycle. Upon deenergization of magnet FM, armature contacts 17a (also see Fig. 2) reclose. These contacts are in the circuit of fusion relay coil FN1 (Fig. 15a). However, the circuit of this coil is not completed until both cam contacts C4 and relay contacts CLf close. Coil CL is held through cam contacts F4. When these cam contacts open during the last sensing cycle on a group of cards and cause deenergization of coil CL, contacts CLf close. With contacts 17a also closed, the next closure of cam contacts C4 completes a circuit via these cam contacts and contacts CLf, 17a and Lb, through coil FN1. Contacts FN1a close and complete a stick circuit by way of cam contacts C6. Upon subsequent closure of cam contacts C10, a branch circuit, also extending through the upper side of contacts FN2b, is completed through magnet LH. Contacts LH11 close to provide a shunt circuit for coil FN1 to bridge the open interval of cam contacts C6.

Magnet LH also closes contacts LHa and LH4 to 10 (Fig. 15b). Contacts LH4 to 9 are in the same relation to the long cycle emitter and readout commutators of the multiples orders as in the Hollerith card embodiment. Accordingly, during the first half of the fusion cycle, the left hand digits of the products of the common factor by the values registered in the multiples orders will be transmitted to the singles accumulator. Contacts LH10 route circuits through the stop magnets SM of the singles accumulator at the proper time. Near the end of the first half of the fusion cycle, coil FN2 is picked up through contacts FN1b and cam contacts C5. Contacts FN2a close to provide a holding circuit for coil FN2 through cam contacts C6. Contacts FN2b are shifted to prevent energization of magnet LH during the second half of the fusion cycle. Cam contacts C11 close at the beginning of the second half of the fusion cycle and magnet RH is energized by a circuit path extending through these cam contacts, the lower side of contacts FN2b, contacts FN1a and cam contacts C6. Contacts RH11 open to deenergize coil L. Contacts RH1 to 10 (Fig. 15b) and contacts RHa are closed by magnet RH. Accordingly, during the second half of the fusion cycle, the right hand digits of the products of the multiples totals by the common factor will be transferred to the singles accumulator. At the proper time, the stop magnets of the singles accumulator will be energized by a circuit routed through contacts RH10 and the spot 0 of the long cycle emitters.

Carry operations in the singles accumulator, wherever carry conditions have been set up during the product entries occurring in each half of the fusion cycle, will take place in the same way as during the component entry operation.

At the end of the fusion operations, the singles accumulator will register the total of the values represented by components on the cards of the group, with such total being based on the cardinal, decimal system. This total is either a negative or positive total. A negative total is indicated by a 9 standing in the highest order; i. e., the 10THDS. order, and such negative total is the nines complementary equivalent of the true negative total.

The recording and reset operations are effected in the same manner as in the Hollerith card embodiment. Briefly, to start recording operation, the total key is depressed to close contacts TK and cause the magnet TRM, coil TR, recording clutch magnet TM, and plugged-in magnets TRS to be energized at a time determined by cam contacts C9. A holding circuit is established through contacts TRa and TP2. Magnets TRS close contacts TRSa (Fig. 15b) between selecting magnets RM and plug sockets 255 from which plug wires 256 extend to sockets 257 wired to the common segments of the singles readout commutators. Magnet TRM closes contacts TRM1 to 9. During the recording cycle, emitter RE transmits impulses through the contacts TRM1 to 9 and the readout commutators of the singles accumulator to energize the magnets RM at differential times corresponding to the digits of the cardinal value total registered in the singles accumulator. The magnets RM thereby select recording elements to record the total. Near the end of the recording cycle, contacts TP2 open and magnets TM, TRM, TR, and TRS are deenergized.

To start reset operation, the reset key (Fig. 15a) is depressed, closing contacts 131, and at a time determined by closure of cam contacts C4, the magnets REM, R, and RTM, and RTS are energized. Through contacts Ra and C8, these magnets are held energized. Magnets RTS, RTM shift their respective contacts RTSa and RTMa (Fig. 15b). Contacts REM1 to 9 are closed by magnet REM, respectively, complementarily connecting the spots 9 to 1 of the long cycle emitter to the readout commutators of both the accumulators. Contacts REM0 connect the 0 spot of the long cycle emitter to the line 242 to energize the stop magnets of the singles orders by way of the left sides of contacts RSb. Contacts M0 closed by magnet REM connect the 0 emitter spot to the line 246, leading via the left sides of contacts MSb through the stop magnets of the multiples accumulator. Contacts REM11 connect the 11 emitter spot to the start relay coil SK. During the cycle of the emitter LE, the "tens" complements of the digits registered in the accumulator orders are entered in the orders, thereby advancing them to zero positions. The cam contacts C8, in this embodiment, do not open until shortly after the 13th point of the long cycle. By then, both cam contacts C12 and C13 have been closed and opened again and, hence, no carry circuits will be established. At about the 14th point of the cycle, the latched carry contacts are released as the pin 106 (Fig. 3) rides past the latch 104 (see Figs. 6 and 8).

While there has been shown and described and pointed out the fundamental novel features of the invention as applied to several embodiments, it will be understood that various omissions and substitutions and changes in the form and details of the structures illustrated and in their operations may be made by those skilled in the art without departing from the principle and spirit of the invention. It is intended, therefore, to be limited only as indicated by the scope of the following claims.

What is claimed is:

1. A machine for handling records bearing designations of multiples component values and remainders component values derived from a cardinal notation of digital values by dividing the digital values by a common factor, comprising means to sense the designations of multiples and remainders component values, accumulating means including a multiples accumulator and a remainders accumulator, means controlled by the sensing means for transmitting entries to the multiples accumulator according to the designated multiples component values and for transmitting entries to the remainders accumulator according to the designated remainders component values, and means rendered effective at the conclusion of entries of component values derived from a plurality of said records for multiplying, under control of the multiples accumulator, a multiples total in the multiples accumulator by the common factor and adding the product with the remainders total to provide a single total manifestation, in the accumulating means, based on the cardinal notation.

2. In combination, accumulating means comprising a plurality of separate accumulators, each including ordered accumulator elements and carry means denominationally relating them, each accumulator element being differentially movable to register any of the cardinal digits of a notation including the highest cardinal digit, means to enter a promiscuous number of amounts in succession in the accumulating means and comprising entry controlling means operative in accordance with the digits, in the cardinal notation, of said amounts and means controlled by the entry controlling means to resolve the cardinal notational digits into component values and means to enter component values derived from each digit of each amount in corresponding orders of the accumulators by moving such order element of each accumulator differentially according to one component value, each different component value being a fraction of the highest cardinal digit whereby each order element is differentially moved, for any component value entry, a fraction of the differential movement required for entry of the highest cardinal digit, and means rendered effective after said promiscuous number of amounts have been entered as component values and separately totaled in the separate accumulators for coacting with the component value entry receiving accumulators for converting said separate totals into a representation in the accumulating means of a single cardinal notational total of said successively entered amounts.

3. In combination, accumulating means to accumulate component values derived from a cardinal notation of digital values, with one component value of each digital value being the highest going multiple of a common divisor factor and the other component value of each digital value being the remainder, said accumulating means including a plural order multiples receiving accumulator and a separate, remainders receiving accumulator with like plural orders, means to enter amounts additively in the accumulators as natural multiples and remainders and subtractively as complement multiples and remainders, and means to multiply the multiples balance in the multiples accumulator by the common factor and to transfer the product to the remainders accumulator, said multiplying means including means to route entries of the left hand digit of the product of the factor and the value in each order, except the highest order, of the multiples accumulator to the next higher order of the remainders accumulator and to route entries of the left hand digit of the product of the factor and the value in the highest order of the multiples accumulator to the units order of the remainders accumulator and including means to route entries of the right hand digits of the products of which the values in the orders of the multiples accumulator are factors to the corresponding orders of the remainders accumulator, all of said entries combining with the remainders total to provide a correct single complementary or natural cardinal notational balance of the amounts entered in the accumulating means.

4. A machine for handling records in succession, each bearing designations of the digits of an amount, means to sense one record after another for said designations, accumulating means comprising a plurality of separate accumulators, each including a plurality of denominational orders of accumulator elements and carry means connecting them, devices controlled by the sensing means to resolve each designated digit in an order of an amount on a record into a plurality of component values, means controlled by said devices for entering the component values of each said resolved digit into corresponding orders of the separate accumulators, each component value into one said accumulator, whereby each accumulator separately accumulates the total of component values entered therein and resolved from the digits of the amounts designated on the successive records, and means rendered effective at the conclusion of entries of component values derived from a plurality of said records and coacting with the component value entry receiving accumulators for arithmetically combining the separate totals of component values into a single representation in the accumulating means of the total of the amounts designated on the aforesaid plurality of records.

5. A cyclically operating accounting machine comprising accumulating means including separate multiples and remainders accumulators, each having denominational orders of accumulator elements and carry means connecting them, each element being differentially movable and of cardinal notation capacity to be capable in a given cyclic period of being differentially movable to receive entry of and to register the highest digital value of the cardinal notation, means to sense records in motion for designations of a plurality of amounts within each such cyclic interval, means controlled by the sensing means for causing entry of the plurality of designated amounts within such cyclic interval as multiples component values in the multiples accumulator and as remainder component values in the remainders accumulator, said multiples and remaiders component values being derived from the cardinal notational values by dividing the latter values by a common factor, whereby each digital cardinal value is resolved into a multiple or remainder component or both, whereby each accumulator separately accumulates the total of component values entered therein, and means rendered effective at the conclusion of entries of the multiples and remainders component values derived from a plurality of said records to arithmetically combine the separate totals into a single total in the accumulating means and including means controlled by the multiples accumulator to multiply the multiples total by the common factor and to integrate the product with the remainders total.

6. A cyclically operating accounting machine comprising accumulating means including separate accumulators, each with denominational orders of accumulator elements and carry means denominationally connecting them, each element being differentially movable and of cardinal notation capacity to be capable in a given cyclic interval of being differentially movable to receive entry of and to register the highest digital value of the cardinal notation, means to sense records in motion for cardinal value designations of a plurality of amounts within each such cyclic interval, coding devices, means coacting with the sensing means to control the coding devices to manifest each digital value of a designated amount as a multiple component value and a remainder component value of which the multiple component value when multiplied by a common factor and added to the remainder component value equals the said digital value, means controlled by the coding devices to cause differential movement of corresponding orders of the multiples and remainders accumulators respectively to receive entries of the multiple and remainder component values, whereby each accumulator separately accumulates the total of component values entered therein and derived from the amounts designated on the records, and means to gather the separate totals into a single cardinal notation total in the accumulating means of the plurality of amounts designated on the records and including means to multiply the multiples total by the common factor and to integrate the product with the remainders total.

7. A cyclically operating accounting machine comprising separate multiples and remainders accumulators, each with a plurality of denominationally ordered accumulator elements of cardinal notational capacity to register the highest digital value of the cardinal notation and differentially movable within a given cyclic period to enter the said highest digital value, means to sense records in motion for designations of the cardinal value digits of a plurality of amounts within each of a plurality of such cyclic intervals, coding devices, means coacting with the sensing means for bringing about operation of the coding devices in combination for manifesting each designated cardinal value digit of each amount as a multiple component and a remainder component of which the multiple component when multiplied by a common factor and added to the remainder component equals the cardinal value of said digit, means controlled by the coding devices for causing differential movement of corresponding orders of the multiples and remainders accumulators respectively to receive entries of the multiples and remainders component values of the corresponding order digit of each designated amount, whereby the accumulators respectively accumulate separate totals of the multiples and remainders components and means coacting with the multiples accumulator to multiply the total of the multiples by the common factor and to transfer the product to the remainders accumulator whereby the latter registers a single cardinal notational total of the plurality of designated amounts.

8. A cyclically operating accounting machine comprising accumulating means including a multiples accumulator and a remainders accumulator, each including denominationally ordered registering and accumulating elements, each of a capacity to register value 9 and differentially movable during differential times of a given cyclic interval through 1 to 9 value steps, means to sense a plurality of records in motion during such cyclic interval for designations of decimal notation digits of a plurality of amounts, one amount on each record, coding relays, circuits coacting with the sensing means for bringing about operation of the coding devices in combination in accordance with multiple and remainder components of each designated digit of each amount and of which the multiple component times a common factor and added to the remainder component equals the value of the designated digit, circuits closed under control of said coding relays at differential times of said given cyclic interval, means controlled by said circuits for differentially moving corresponding orders of the multiples and remainders accumulator respectively to receive the multiple and remainder components, whereby each accumulator separately accumulates a total of the components entered therein and derived from the plurality of designated amounts, and means coacting with the multiples accumulator to multiply the multiples total by the common factor and to add the product to the remainders total in the remainders accumulator, to produce in the accumulating means a representation of a single decimal notation total of the plurality of designated amounts.

9. A machine for operating on records bearing amount designations, comprising means for sensing the designations of the records, accumulating means including a multiples accumulator for receiving entries of multiples component values and a singles accumulator for receiving entries of remainders components values of a component value notation derived from a cardinal value notation by dividing the digital values of the cardinal notation by a common factor, each accumulator having a plurality of orders of accumulator elements and carry means connecting them, means controlled by the sensing means according to designations sensed thereby on each record for entering each order digit of each amount as multiples and remainders components values into corresponding orders of their respective accumulators, whereby each accumulator separately accumulates the total of component values derived from a plurality of amounts designated on said records, and means rendered effective at the conclusion of entries of component values derived from a plurality of said records for arithmetically combining the separate component totals into a single cardinal notational total in the accumulating means of the amounts designated on the records and including means controlled by the multiples accumulator for multiplying the multiples total in the multiples accumulator by the common factor and integrating the product with the remainders total in the singles accumulator.

10. A machine having means for feeding records bearing amount designations, accumulating means including a plural order multiples accumulator and a separate plural order singles accumulator, each with its own carry means, for respectively receiving and separately totaling entries of multiples and remainders component values of a component value notation derived from a cardinal notation of digital values by dividing the digital values thereof by a common factor, means to sense the designations of a series of the records, one record after another, means controlled thereby for entering the amounts designated on the series of records, one amount at a time, as multiples and remainders component values in their respective accumulators, whereby the accumulators separately total the multiples and remainders component values derived from the designated amounts, means operative upon passage of the last record of a series, means controlled thereby to initiate a component totals conversion operation, and conversion means thereupon effective for converting the separate component totals into a single cardinal notational total in the accumulating means and including means controlled by the multiples accumulator to multiply the multiples total by the common factor and to integrate the product with the remainders total.

GEORGE F. DALY.